US009868873B2

(12) United States Patent
Iftime et al.

(10) Patent No.: US 9,868,873 B2
(45) Date of Patent: *Jan. 16, 2018

(54) PHOTOCHROMIC SECURITY ENABLED INK FOR DIGITAL OFFSET PRINTING APPLICATIONS

(75) Inventors: Gabriel Iftime, Mississauga (CA); Marcel P. Breton, Mississauga (CA); Frank Ping-Hay Lee, Oakville (CA); Aurelian Valeriu Magdalinis, Aurora (CA); Naveen Chopra, Oakville (CA); Peter Gordon Odell, Mississauga (CA); Carolyn Moorlag, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 1023 days.

This patent is subject to a terminal disclaimer.

(21) Appl. No.: 13/473,921

(22) Filed: May 17, 2012

(65) Prior Publication Data

US 2013/0305947 A1  Nov. 21, 2013

(51) Int. Cl.
| | |
|---|---|
| *C09D 11/02* | (2014.01) |
| *B41F 33/00* | (2006.01) |
| *C09D 11/50* | (2014.01) |
| *C09D 11/101* | (2014.01) |
| *B41M 3/14* | (2006.01) |

(52) U.S. Cl.
CPC ............. *C09D 11/50* (2013.01); *B41M 3/142* (2013.01); *C09D 11/101* (2013.01)

(58) Field of Classification Search
CPC ....... C09D 11/50; C09D 11/101; B41M 3/142
See application file for complete search history.

(56) References Cited

U.S. PATENT DOCUMENTS

| 3,945,957 A | 3/1976 | Noshiro et al. |
| 4,304,601 A | 12/1981 | Sharp |
| 4,403,550 A | 9/1983 | Sharp |
| 4,445,432 A | 5/1984 | Ford, Jr. et al. |

(Continued)

FOREIGN PATENT DOCUMENTS

| EP | 1235863 B1 | 1/2005 |
| JP | 03069954 A | 3/1991 |

(Continued)

OTHER PUBLICATIONS

Henri Bouas-Laurent et al., Organic Photochromism (IUPAC Technical Report), Pure Appl. Chem., vol. 73, No. 4, pp. 639-665, 2001.

(Continued)

*Primary Examiner* — Matthew G Marini
*Assistant Examiner* — Quang X Nguyen
(74) *Attorney, Agent, or Firm* — MH2 Technology Law Group LLP

(57) ABSTRACT

An ink composition useful for digital offset printing applications comprises a photochromic material and a plurality of curable compounds. The compounds have Hansen solubility parameters as described herein, and the resulting ink composition is both compatible with certain dampening fluids and has certain rheological properties, including a low viscosity. The photochromic ink compositions are useful for providing security information in certain printing applications.

14 Claims, 6 Drawing Sheets

(56) References Cited

U.S. PATENT DOCUMENTS

| | | | |
|---|---|---|---|
| 4,711,818 A | 12/1987 | Henry | |
| 4,806,391 A | 2/1989 | Shorin | |
| 4,911,999 A | 3/1990 | Legere | |
| 4,927,180 A * | 5/1990 | Trundle | B41M 3/142 |
| | | | 283/70 |
| 5,085,698 A | 2/1992 | Ma et al. | |
| 5,502,476 A | 3/1996 | Neal et al. | |
| 5,834,118 A | 11/1998 | Ranby et al. | |
| 5,886,067 A | 3/1999 | Li et al. | |
| 5,977,202 A | 11/1999 | Chawla et al. | |
| 6,114,489 A | 9/2000 | Vicari et al. | |
| 6,140,392 A | 10/2000 | Kingman et al. | |
| 6,239,189 B1 | 5/2001 | Narayan et al. | |
| 6,329,446 B1 | 12/2001 | Sacripante et al. | |
| 6,348,561 B1 | 2/2002 | Mychajlowskij et al. | |
| 6,664,015 B1 | 12/2003 | Sacripante | |
| 6,896,937 B2 | 5/2005 | Woudenberg | |
| 7,022,752 B2 | 4/2006 | Hayashi et al. | |
| 7,151,153 B2 | 12/2006 | Bruchmann et al. | |
| 7,202,006 B2 | 4/2007 | Chopra et al. | |
| 7,208,258 B2 | 4/2007 | Gervasi et al. | |
| 7,322,688 B2 | 1/2008 | Woudenberg | |
| 7,538,070 B2 | 5/2009 | Iftime et al. | |
| 7,556,844 B2 * | 7/2009 | Iftime | C09D 11/101 |
| | | | 427/510 |
| 7,674,326 B2 | 3/2010 | Iftime et al. | |
| 7,708,396 B2 | 5/2010 | Iftime et al. | |
| 7,718,325 B2 | 5/2010 | Norsten et al. | |
| 7,723,398 B2 | 5/2010 | Ilg et al. | |
| 7,909,924 B2 | 3/2011 | Krishnan et al. | |
| 7,964,271 B2 | 6/2011 | Norsten et al. | |
| 8,001,889 B2 | 8/2011 | Gaugenrieder et al. | |
| 8,124,791 B2 | 2/2012 | Shinjo et al. | |
| 8,158,693 B2 | 4/2012 | Breton et al. | |
| 8,222,313 B2 | 7/2012 | Iftime et al. | |
| 8,771,787 B2 | 7/2014 | Breton et al. | |
| 8,895,400 B2 | 11/2014 | Seo et al. | |
| 8,934,823 B1 | 1/2015 | Pickering et al. | |
| 9,011,594 B1 | 4/2015 | Kanungo et al. | |
| 9,193,209 B2 | 11/2015 | Dooley et al. | |
| 9,283,795 B1 | 3/2016 | Kanungo et al. | |
| 9,359,512 B2 | 6/2016 | Moorlag et al. | |
| 9,387,661 B2 | 7/2016 | Zirilli | |
| 9,422,436 B2 | 8/2016 | Birau et al. | |
| 2002/0040073 A1 | 4/2002 | Stone et al. | |
| 2002/0107303 A1 | 8/2002 | Miyabashi et al. | |
| 2003/0003323 A1 | 1/2003 | Murakami | |
| 2003/0018100 A1 | 1/2003 | Foucher et al. | |
| 2003/0021961 A1 | 1/2003 | Ylitalo et al. | |
| 2003/0044691 A1 | 3/2003 | Setthachayanon et al. | |
| 2003/0073762 A1 | 4/2003 | Jung et al. | |
| 2003/0149130 A1 | 8/2003 | Kondo | |
| 2003/0187098 A1 | 10/2003 | Chen et al. | |
| 2004/0009363 A1 | 1/2004 | Shouldice et al. | |
| 2004/0063809 A1 | 4/2004 | Fu et al. | |
| 2004/0132862 A1 | 7/2004 | Woudenberg | |
| 2004/0233465 A1 * | 11/2004 | Coyle | B41M 3/008 |
| | | | 358/1.9 |
| 2005/0166783 A1 | 8/2005 | Ylitalo et al. | |
| 2006/0054040 A1 | 3/2006 | Daems et al. | |
| 2006/0110611 A1 | 5/2006 | Badesha et al. | |
| 2007/0073762 A1 | 3/2007 | Adamson et al. | |
| 2007/0166479 A1 | 7/2007 | Drake et al. | |
| 2007/0257976 A1 | 11/2007 | Takabayashi | |
| 2007/0259986 A1 | 11/2007 | Elwakil et al. | |
| 2008/0090929 A1 | 4/2008 | Wilson et al. | |
| 2008/0139743 A1 | 6/2008 | Krishnan et al. | |
| 2008/0241485 A1 | 10/2008 | Shimohara et al. | |
| 2008/0258345 A1 * | 10/2008 | Bens | C08F 290/06 |
| | | | 264/401 |
| 2008/0317957 A1 | 12/2008 | Overbeek et al. | |
| 2009/0038506 A1 | 2/2009 | Odell et al. | |
| 2009/0104373 A1 | 4/2009 | Vanbesien et al. | |
| 2009/0110843 A1 | 4/2009 | Halahmi et al. | |
| 2009/0135239 A1 | 5/2009 | Chretien et al. | |
| 2009/0280302 A1 | 11/2009 | Fukumoto et al. | |
| 2010/0020123 A1 | 1/2010 | Hirato | |
| 2010/0067056 A1 | 3/2010 | Rich et al. | |
| 2010/0214373 A1* | 8/2010 | Carr | B41M 3/142 |
| | | | 347/73 |
| 2010/0239777 A1 | 9/2010 | Nakajima et al. | |
| 2010/0304040 A1 | 12/2010 | Chretien et al. | |
| 2011/0045199 A1 | 2/2011 | Cong | |
| 2011/0141187 A1 | 6/2011 | Takabayashi et al. | |
| 2011/0188023 A1 | 8/2011 | Rondon et al. | |
| 2011/0196058 A1 | 8/2011 | Breton et al. | |
| 2011/0243629 A1 | 10/2011 | Roberts et al. | |
| 2011/0262711 A1 | 10/2011 | Chopra et al. | |
| 2012/0040156 A1 | 2/2012 | Ohashi et al. | |
| 2012/0103212 A1 | 5/2012 | Stowe et al. | |
| 2012/0103213 A1 | 5/2012 | Stowe et al. | |
| 2012/0103218 A1 | 5/2012 | Stowe et al. | |
| 2012/0103221 A1 | 5/2012 | Stowe et al. | |
| 2012/0157561 A1 | 6/2012 | Gould et al. | |
| 2012/0309896 A1 | 12/2012 | Carlini et al. | |
| 2013/0050366 A1 | 2/2013 | Sasada et al. | |
| 2013/0085208 A1 | 4/2013 | Norikoshi et al. | |
| 2013/0104756 A1 | 5/2013 | Stowe et al. | |
| 2013/0305946 A1 | 11/2013 | Iftime et al. | |
| 2013/0307913 A1 | 11/2013 | Kawashima et al. | |
| 2013/0310479 A1 | 11/2013 | Lee et al. | |
| 2013/0310517 A1 | 11/2013 | Lee et al. | |
| 2013/0324653 A1 | 12/2013 | Bollard et al. | |
| 2014/0235752 A1 | 8/2014 | Gharapetian et al. | |
| 2014/0333704 A1 | 11/2014 | Takabayashi et al. | |
| 2014/0340455 A1 | 11/2014 | Breton et al. | |
| 2015/0077501 A1 | 3/2015 | Breton et al. | |
| 2015/0093690 A1 | 4/2015 | Shimura et al. | |
| 2015/0116416 A1 | 4/2015 | Belelie et al. | |
| 2015/0170498 A1 | 6/2015 | Beggs et al. | |
| 2015/0174887 A1 | 6/2015 | Moorlag et al. | |
| 2015/0175820 A1 | 6/2015 | Breton et al. | |
| 2015/0175821 A1 | 6/2015 | Moorlag et al. | |
| 2016/0090490 A1 | 3/2016 | Moorlag et al. | |
| 2016/0176185 A1 | 6/2016 | Kanungo et al. | |
| 2016/0177113 A1 | 6/2016 | Allen et al. | |
| 2016/0222231 A1 | 8/2016 | Allen et al. | |
| 2016/0230027 A1 | 8/2016 | Birau et al. | |
| 2016/0237290 A1 | 8/2016 | Moorlag et al. | |
| 2016/0257829 A1 | 9/2016 | Breton et al. | |
| 2016/0264798 A1 | 9/2016 | Allen et al. | |
| 2016/0333205 A1 | 11/2016 | Lee et al. | |

FOREIGN PATENT DOCUMENTS

| | | |
|---|---|---|
| JP | 2011208019 A | 10/2011 |
| WO | 2013119539 A1 | 8/2013 |

OTHER PUBLICATIONS

Allen, et al., "Acrylate Ink Compositions for Ink-Based Digital Lithographic Printing", U.S. Appl. No. 14/610,437, filed Jan. 30, 2015.

Birau, et al., "White Ink Composition for Ink-Based Digital Printing", U.S. Appl. No. 14/619,820, filed Feb. 11, 2015.

Moorlag, et al., "Hyperbranched Ink Compositions for Controlled Dimensional Change and Low Energy Curing", U.S. Appl. No. 14/620,945, filed Feb. 12, 2015.

Breton, et al., "Process Black Ink Compositions and Uses Thereof", U.S. Appl. No. 14/635,679, filed Mar. 2, 2015.

Leach, et al., "The Printing Ink Manual, 5th Edition", Blue Print, New York, pp. 84-86, 516, 525, 544-550, 724-726 (1993).

Thesis of Enrique Michel-Sanchez, Impact of Particle Morphology on the Rheology of PCC-Based Coatings, Aug. 2005.

Communication dated May 4, 2015, issued in EP Appl. No. 14196839.6, pp. 1-5.

Allen, et al., "Acrylate Ink Compositions for Ink-Based Digital Lithographic Printing," U.S. Appl. No. 14/573,913, filed Dec. 17, 2014.

Allen, et al., "Acrylate Ink Compositions for Ink-Based Digital Lithographic Printing", U.S. Appl. No. 14/645,153, filed Mar. 11, 2015.

(56) References Cited

OTHER PUBLICATIONS

Stowe, et al., "Methods for Rejuvenating an Imaging Member of an Ink-Based Digital Printing System", U.S. Appl. No. 15/240,691, filed Aug. 18, 2016.
Badesham et al. "Fluorosilicone composite and Formulation Process for Imaging Plate", U.S. Appl. No. 15/222,364, filed Jul. 28, 2016.
Birau, et al. "Ink Composition and Method of Printing", U.S. Appl. No. 15/377,881, filed Dec. 13, 2016.
Allen, et al., "Acrylate Ink Compositions for Ink-Based Digital Lithographic Printing", U.S. Appl. No. 15/435,098, filed Feb. 16, 2017.
Breton, et al. "Aqueous Dispersible Polymer Inks", U.S. Appl. No. 15/442,260, filed Feb. 24. 2017.

\* cited by examiner

PHOTOCHROMIC SECURITY ENABLED INK FOR DIGITAL OFFSET PRINTING APPLICATIONS

BACKGROUND

The present disclosure relates to certain photochromic ink compositions which are compatible with dampening fluids and are useful for providing security information in variable data lithographic printing applications. This disclosure also relates to methods of using such ink compositions, such as in variable lithographic printing applications.

Offset lithography is a common method of printing today. (For the purposes hereof, the terms "printing" and "marking" are interchangeable.) In a typical lithographic process a printing plate, which may be a flat plate, the surface of a cylinder, or belt, etc., is formed to have "image regions" formed of a hydrophobic/oleophilic material, and "non-image regions" formed of a hydrophilic/oleophobic material. The image regions correspond to the areas on the final print (i.e., the target substrate) that are occupied by a printing or marking material such as ink, whereas the non-image regions correspond to the areas on the final print that are not occupied by said marking material. The hydrophilic regions accept and are readily wetted by a water-based fluid, commonly referred to as a dampening fluid or fountain fluid (typically consisting of water and a small amount of alcohol as well as other additives and/or surfactants to reduce surface tension). The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

The ink may be transferred directly to a target substrate, such as paper, or may be applied to an intermediate surface, such as an offset (or blanket) cylinder in an offset printing system. The offset cylinder is covered with a conformable coating or sleeve with a surface that can conform to the texture of the target substrate, which may have surface peak-to-valley depth somewhat greater than the surface peak-to-valley depth of the imaging plate. Also, the surface roughness of the offset blanket cylinder helps to deliver a more uniform layer of printing material to the target substrate free of defects such as mottle. Sufficient pressure is used to transfer the image from the offset cylinder to the target substrate. Pinching the target substrate between the offset cylinder and an impression cylinder provides this pressure.

Typical lithographic and offset printing techniques utilize plates which are permanently patterned, and are therefore useful only when printing a large number of copies of the same image (i.e. long identical print runs), such as magazines, newspapers, and the like. However, they do not permit creating and printing a new pattern from one page to the next without removing and replacing the print cylinder and/or the imaging plate (i.e., the technique cannot accommodate true high speed variable data printing wherein the image changes from impression to impression, for example, as in the case of digital printing systems). Furthermore, the cost of the permanently patterned imaging plates or cylinders is amortized over the number of copies. The cost per printed copy is therefore higher for shorter print runs of the same image than for longer print runs of the same image, as opposed to prints from digital printing systems.

Accordingly, a lithographic technique, referred to as variable data lithography, has been developed which uses a non-patterned reimageable surface that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned reimageable surface. Ink applied thereover is retained in the pockets formed by the removal of the dampening fluid. The inked surface is then brought into contact with a substrate, and the ink transfers from the pockets in the dampening fluid layer to the substrate. The dampening fluid may then be removed, a new uniform layer of dampening fluid applied to the reimageable surface, and the process repeated.

In the packaging industry, there is a growing need for security features to authenticate a given document and/or make the given document difficult to counterfeit.

BRIEF DESCRIPTION

The present disclosure relates to various ink compositions containing a photochromic material and a plurality of curable compounds. Each curable compound has Hansen solubility parameters as described herein. The photochromic material serves as a security feature for documents printed using the ink compositions of the present disclosure.

Disclosed in embodiments is an ink composition comprising a photochromic material and a plurality of curable compounds, wherein the ink composition has a volume average Hansen fractional dispersion force parameter ($f_d$) of from about 0.4 to about 0.62, a volume average Hansen fractional polar parameter ($f_p$) of from about 0.1 to about 0.3, and a volume average Hansen fractional hydrogen bonding parameter ($f_h$) of from about 0.2 to about 0.4.

The photochromic material may be a spiropyran, spiroxazine, stilbene, aromatic azo compound, benzopyran, naphthopyran, spirodihydroindolizine, quinone, permidinespirocyclohexadienone, viologen, fulgide, fulgimide, diarylethene, triarylmethane, or anil.

The photochromic material may be colorless under ambient light. In some embodiments, the photochromic material is present in an amount of from about 0.005 to about 5 wt % of the ink composition.

The plurality of curable compounds may include a tetrafunctional acrylated ester, a polyethylene glycol diacrylate, or a tripropylene glycol diacrylate.

In some embodiments, the plurality of curable compounds includes, based on the total weight of the ink composition: from about 40 to about 55 wt % of a tetrafunctional acrylated polyester; from about 9 to about 11 wt % of a polyethylene glycol diacrylate; and from 0 to about 11 wt % of a tripropylene glycol diacrylate.

The ink composition may further comprise from greater than 0 to about 20 wt % of an aliphatic acrylate ester. The ink composition may further comprise at least one additive. The additives may be selected from dispersants, thickening agents, photoinitiators, and stabilizers. In particular embodiments, the ink composition comprises from about 2 to about 10 wt % of a dispersant; from about 0.2 to about 5 wt % of a thickening agent; from 0 to about 10 wt % of a photoinitiator; and from about 0.1 to about 1 wt % of a thermal stabilizer, based on the total weight of the ink composition.

The ink composition may contain from about 10 to about 40 wt % of a colorant, based on the total weight of the ink composition.

The ink composition may have a viscosity of from about 5,000 to about 1,000,000 centipoise at 25° C. and a shear rate of 5 sec$^{-1}$. In some embodiments, the ink composition has a viscosity of from about 2,000 to about 90,000 centipoise at 25° C. and a shear rate of 50 sec$^{-1}$.

The ink composition may have a shear thinning index (50/5) at 25° C. of from about 0.35 to about 0.55.

In some embodiments, the ink composition has a surface tension of from about 25 dynes/cm to about 40 dynes/cm at 25° C.

The plurality of curable compounds may comprise more than 50 wt % of the ink composition.

Also disclosed is a process for marking a substrate with a security feature. The process includes printing an image on the substrate with an ink composition that comprises a photochromic material and a plurality of curable compounds, the ink composition having a volume average Hansen fractional dispersion force parameter ($f_d$) of from about 0.4 to about 0.62, a volume average Hansen fractional polar parameter ($f_p$) of from about 0.1 to about 0.3, and a volume average Hansen fractional hydrogen bonding parameter ($f_n$) of from about 0.2 to about 0.4.

The photochromic material may be a spiropyran, spiroxazine, stilbene, aromatic azo compound, benzopyran, naphthopyran, spirodihydroindolizine, quinone, permidinespirocyclohexadienone, viologen, fulgide, fulgimide, diarylethene, triarylmethane, or anil.

In some embodiments, the photochromic material is present in an amount of from about 0.005 to about 5 wt % of the ink composition.

Also disclosed in embodiments is an ink compositions comprising a photochromic material and a plurality of curable compounds, wherein each curable compound has a Hansen fractional dispersion force parameter ($f_d$) of from about 0.4 to about 0.62, a Hansen fractional polar parameter ($f_p$) of from about 0.1 to about 0.3, and a Hansen fractional hydrogen bonding parameter ($f_h$) of from about 0.2 to about 0.4.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
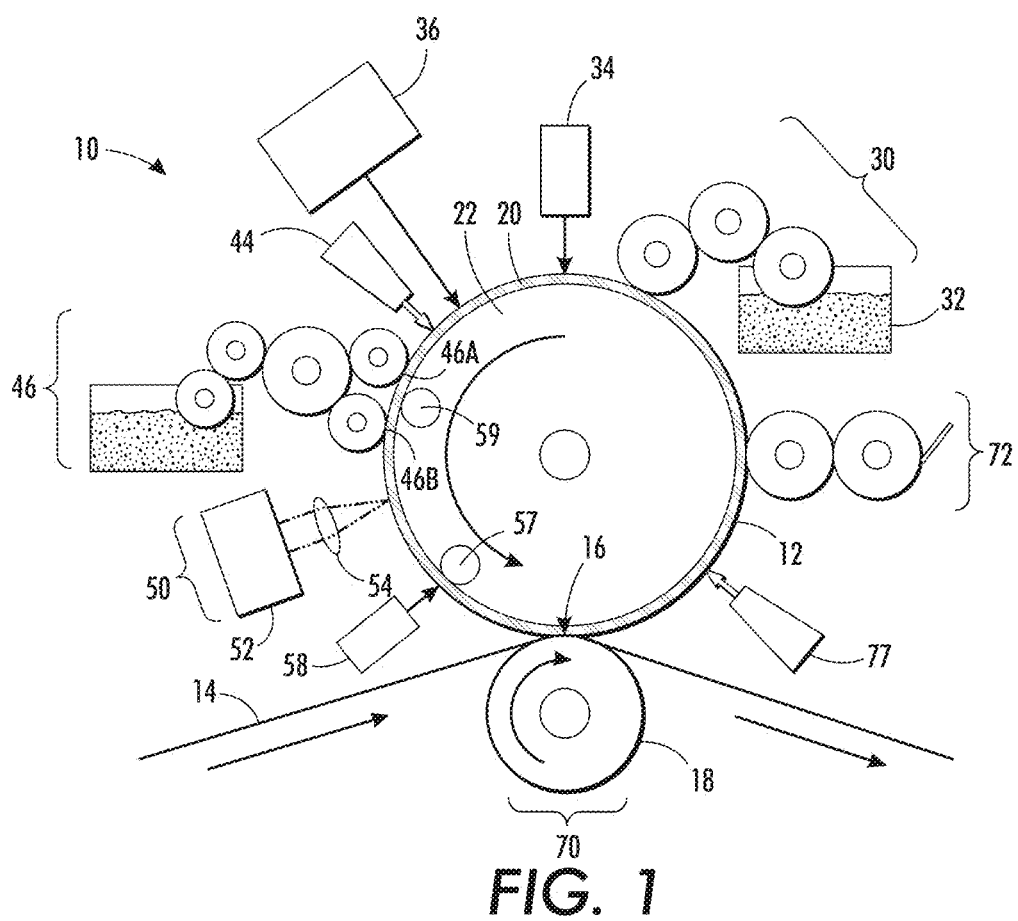
FIG. 1 illustrates a variable lithographic printing apparatus in which the ink compositions of the present disclosure may be used.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The present disclosure relates to ink compositions that are suitable for use in digital offset printing processes. FIG. 1 illustrates a system for variable lithography in which the ink compositions of the present disclosure may be used. The system 10 comprises an imaging member 12. The imaging member comprises a substrate 22 and a reimageable surface layer 20. The surface layer is the outermost layer of the imaging member, i.e. the layer of the imaging member furthest from the substrate. As shown here, the substrate 22 is in the shape of a cylinder; however, the substrate may also be in a belt form, etc. The surface layer 20 is typically a silicone (e.g. a methylsilicone or fluorosilicone), which may have carbon black added to increase energy absorption of the surface layer.

In the depicted embodiment the imaging member 12 rotates counterclockwise and starts with a clean surface. Disposed at a first location is a dampening fluid subsystem 30, which uniformly wets the surface with dampening fluid 32 to form a layer having a uniform and controlled thickness. Ideally the dampening fluid layer is between about 0.05 micrometers and about 1.0 micrometers in thickness, is uniform, and is without pinholes. As explained further below, the composition of the dampening fluid aids in leveling and layer thickness uniformity. A sensor 34, such as an in-situ non-contact laser gloss sensor or laser contrast sensor, is used to confirm the uniformity of the layer. Such a sensor can be used to automate the dampening fluid subsystem 30.

At optical patterning subsystem 36, the dampening fluid layer is exposed to an energy source (e.g. a laser) that selectively applies energy to portions of the layer to imagewise evaporate the dampening fluid and create a latent "negative" of the ink image that is desired to be printed on the receiving substrate. Image areas are created where ink is desired, and non-image areas are created where the dampening fluid remains. An optional air knife 44 is also shown here to control airflow over the surface layer 20 for the purpose of maintaining clean dry air supply, a controlled air temperature, and reducing dust contamination prior to inking. Next, the ink composition is applied to the imaging member using inker subsystem 46. Inker subsystem 46 may consist of a "keyless" system using an anilox roller to meter an offset ink composition onto one or more forming rollers 46A, 46B. The ink composition is applied to the image areas to form an ink image.

A rheology control subsystem 50 may be present to partially cure or tack the ink image. This curing source may be, for example, an ultraviolet light emitting diode (UV-LED) 52, which can be focused as desired using optics 54. Another way of increasing the cohesion and viscosity employs cooling of the ink composition. This could be done, for example, by blowing cool air over the reimageable surface from jet 58 after the ink composition has been applied but before the ink composition is transferred to the target substrate. Alternatively, a heating element 59 could be used near the inker subsystem 46 to maintain a first temperature and a cooling element 57 could be used to maintain a cooler second temperature near the nip 16.

The ink image is then transferred to the target or receiving substrate 14 at transfer subsystem 70. This is accomplished by passing a recording medium or receiving substrate 14, such as paper, through the nip 16 between the impression roller 18 and the imaging member 12. The final receiving substrate 14 can be, for example, paper, plastic, or metal.

Finally, the imaging member should be cleaned of any residual ink or dampening fluid. Most of this residue can be easily removed quickly using an air knife 77 with sufficient air flow. Removal of any remaining ink can be accomplished at cleaning subsystem 72.

It should be noted that the apparatus depicted in FIG. 1 transfers the ink directly from the imaging member to the paper, so that the ink must fully release from the imaging member and should enable high quality printing at high speeds. Traditional offset inks are designed to work best with an intermediate transfer member between the imaging member and the final target substrate (i.e. paper). Traditional inks suffer from one or more shortfalls including: solubility in the dampening fluid, swelling of the silicone layer on the imaging member, poor release properties from the imaging member, and limited curing performance. The ink compositions of the present disclosure have certain wetting and release properties that are useful with the imaging member, and the ink compositions are also compatible with non-aqueous dampening fluids.

The ink compositions of the present disclosure comprise a photochromic material and a plurality of selected curable compounds. The curable compounds can be cured under ultraviolet (UV) light to fix the ink in place on the final receiving substrate. The photochromic material serves as a security feature.

Initially, the ink composition comprises a photochromic material. Photochromic as used herein refers to, for example, a material that undergoes a reversible change from a first color state to a second color state, for example from a substantially colorless state to a colored state, upon exposure to radiation of an appropriate wavelength. The photochromic effect (photochromism) in general is thus a reversible change of a chemical species between two states having distinguishably different absorption spectra (color), wherein the change is induced in at least one direction by the action of activating radiation. The chemical species exhibiting photochromism may be a molecule or an ion, and the reversible change in states may be a conversion between two molecules or ions, or the dissociation of a single molecule or ion into two or more species, with the reverse change being a recombination of the two or more species thus formed into the original molecule or ion.

Color refers to, for example, the overall absorption characteristic within the same range of wavelengths of the electromagnetic spectrum. Thus, differently colored inks exhibit a color, that is, an absorption characteristic, different from each other. For example, if a first ink exhibits a yellow color, then a second differently colored ink must exhibit a different shade of yellow or a different color altogether, for example such as cyan or magenta.

In a first embodiment, the photochromic ink is comprised of at least one radiation curable component, at least one photochromic material and at least one photoinitiator, and an optional colorant.

The photochromic material may be present in the ink composition in any effective amount. For example, the photochromic material may be present in the ink composition in an amount of from about 1 to about 50% by weight, such as from about 1 to about 10% by weight or from about 3 to about 10% by weight, of the ink composition.

As the photochromic material, a material having high fatigue resistance may be used. This is specifically the case where the photochromic material exhibits photochromism at wavelengths of radiation that include the wavelengths of UV radiation used to cure the ink.

A photochromic material undergoes a reversible change in color upon exposure to activating radiation. For example, a substantially colorless form of a photochromic compound undergoes a transformation following exposure to activating radiation, for example UV light, to a different form of the compound that exhibits a visible color such as blue, red, yellow, and the like. Thus, in an ink, the colored form of the photochromic material following exposure to UV light will render a substantially colorless image visible in color, and in a colored ink, will alter the color exhibited by the colored ink containing the photochromic material. Upon exposure to visible light, for example sunlight or room light (incandescent light), the colored form of the photochromic material reverts to the substantially colorless form. Typically, the more intense the visible light, the more rapidly the reverse reaction to the substantially colorless form occurs.

Photochromic, or photochromic ink, thus refers to, for example, the capability of the photochromic material or ink to change color from a first color state to a second color state different from the first color state, after exposure to an activating radiation, for example a radiation source having a wavelength from about 100 nm to about 1100 nm. The activating radiation may thus be in the ultraviolet (UV), visible or infrared regions, although the use of activating radiation in the UV region (from about 100 nm to about 400 nm) is most common. The change of color, or absorption behavior, may occur instantaneously on exposure to the activating radiation, or may occur after overcoming any activation phase. The color change exhibited by the photochromic ink is ideally reversible, but should last for a time period permitting the color change to be detected, for example a time frame of from about 0.5 second to about 1 hour, one day, one week, or more. Reversibility, or color cancellation, of the color change may be accelerated, depending on the selected photochromic materials, for example by heating, by exposure to a distinct wavelength radiation different from that of the first coloration (for example sun light radiation or other visible light such as room light), and the like.

It is desirable for the photochromic material to be able to undergo the coloration/decoloration cycle a large number of times so that the photochromic capabilities of a document printed with the photochromic ink are not quickly lost. However, because the coloration/decoloration cycle in most photochromic materials involves a chemical conversion or reaction, degradation, for example through the action of undesired side reactions, may occur over time. The higher the number of coloration/decoloration cycles that a photochromic material may undergo, the higher is the material's fatigue resistance.

The photochromic inks described herein are typically curable upon exposure to UV light. The length of exposure time in curing the ink may be significantly longer than the time usually required for a color change to be effected in a photochromic material. The exposure to radiation in curing the ink thus may significantly degrade a photochromic material in the ink that undergoes a color change at the radiation wavelengths used for curing. Thus, for inks containing photochromic materials that undergo a color change upon exposure to radiation having a wavelength the same as that used in curing the ink, it is necessary for the photochromic material to have high fatigue resistance. High fatigue resistance photochromic compounds refer in embodiments to photochromic compounds that will still perform a number of coloration/decoloration cycles following curing of the photochromic ink by exposure to curing radiation. For example, the photochromic material undergoes from about 10 to about 10,000,000, for example from about 10 to about 1,000,000 or from about 20 to about 500,000, coloration/decoloration cycles. A low fatigue resistance compound shows no photochromic activity after exposure to the curing radiation. Examples of low fatigue resistance compounds are, for example, some spiropyrans like 1',3'-dihydro-1',3',3'-trimethyl-6-nitrospiro-[2H-1-benzopyran-2,2'-(2H)-indole] that is completely degraded by exposure to the curing radiation. Other spiropyran compounds, however, may possess sufficient fatigue resistance so that they are still photochromically active after curing.

Any photochromic compound that has sufficient fatigue resistance so that it shows photochromic activity after photocuring is thus suitable for use in the ink compositions described herein. The photochromic material may be a small molecule, or it may optionally be incorporated into a polymeric structure, for example by attachment to/as a side chain, or by inclusion in the main chain of the polymer. Examples of suitable photochromic materials include diarylethenes; compounds that undergo heterolytic cleavage, such as spiropyrans, spiroxazines, and the like; fulgides and fulgimides; compounds that undergo cis-trans isomerization, such as stilbenes, aromatic azo compounds, and the like; benzopyrans and naphthopyrans (chromenes); bisimidazoles; spirodihydroindolizines; quinones; permidinespirocyclohexadienones; viologens; triarylmethanes; anils; and others. Dithienylethenes and fulgides are examples of molecules that generally exhibit thermal bi-stability. Spiropyrans and azabenzenes, are examples of molecules that are both photochromic and thermochromic. Mixtures of two or more photochromic materials may be used together in any suitable ratio.

An exemplary photochromic material having high fatigue resistance is a, diarylethene having a Formula (1) and undergoing a reversible color change reaction as shown below:

Formula (1)

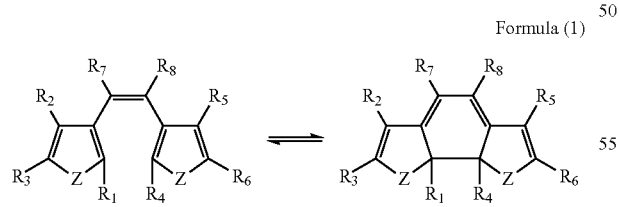

wherein Z is independently O, S, or NR; and $R_1$, $R_2$, $R_3$, $R_4$, $R_5$, $R_6$, $R_7$, and $R_8$ are independently hydrogen, alkyl, aryl, arylalkyl, heteroaryl, silyl, nitro, sulfo, cyano, halogen, amine, hydroxyl, alkoxy, aryloxy, alkylthio, alkylsulfo, arylthio, arylsulfo, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, substituted alkylsulfo, substituted arylthio, or substituted arylsulfo; and wherein two adjacent R groups can be joined together to form a ring. It is specifically contemplated, for example, that $R_2$ and $R_3$ can form a phenyl ring, and $R_6$ and $R_7$ can form a phenyl ring. In preferred embodiments, $R_7$ and $R_8$ form a ring. For example, $R_7$ and $R_8$ can form the following rings:

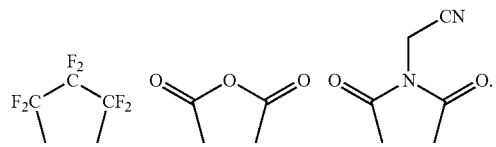

In particular embodiments, $R_1$ and $R_4$ are independently alkyl, alkoxy or aryl.

Some specific examples of diarylethylenes include 1,2-bis-(2,4-dimethylthiophen-3-yl) perfluorocyclopentene; 1,2-bis-(3,5-dimethylthiophen-3-yl) perfluorocyclopentene; 1,2-bis-(2,4-diphenylthiophen-3-yl)perfluorocyclopentene; and the like. Other suitable diarylethene compounds usable herein as photochromic materials include those depicted below:

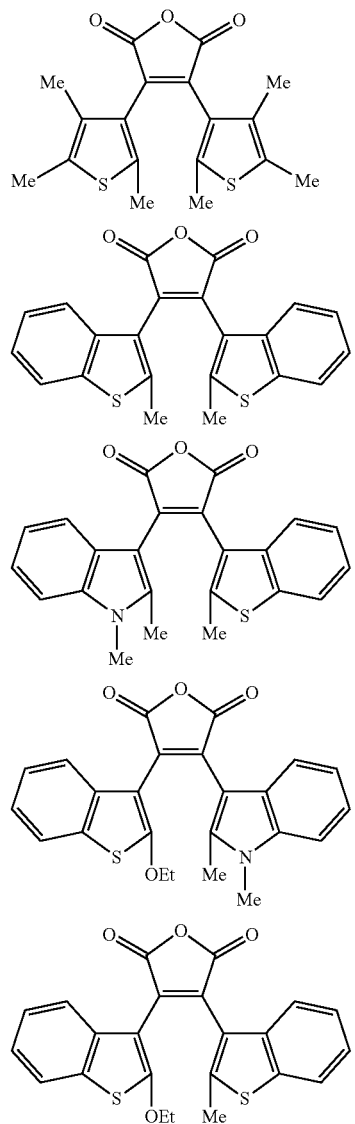

-continued

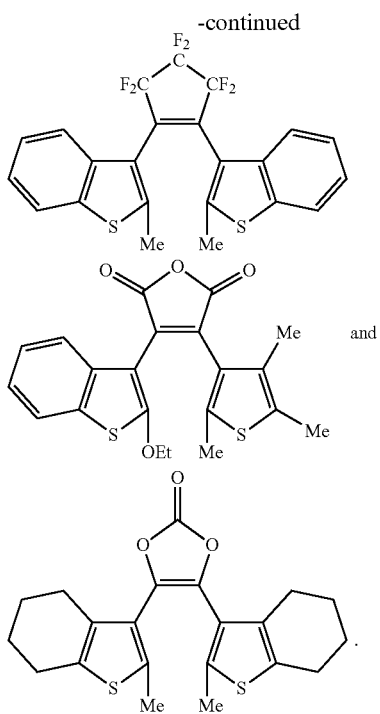

A specific diarylethene, and the reversible color change reaction of the diarylethene, is as follows:

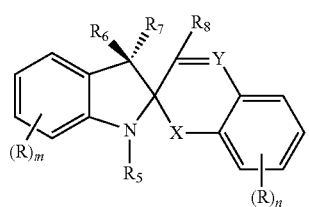

Clear State

This compound switches between a colorless state, upon exposure to visible light such as sunlight or room light (incandescent light), and a dark blue state, upon exposure to UV light. The closed ring, or colored, form of this compound is, like other diarylethenes, thermally stable in the dark, which means that a printed document may retain the colored state for a very long period of time, for example for about 10 days to about 6 months or more, when protected from exposure to visible light.

Another class of suitable photochromic materials includes spiropyrans or spiroxazines of the general Formula (2):

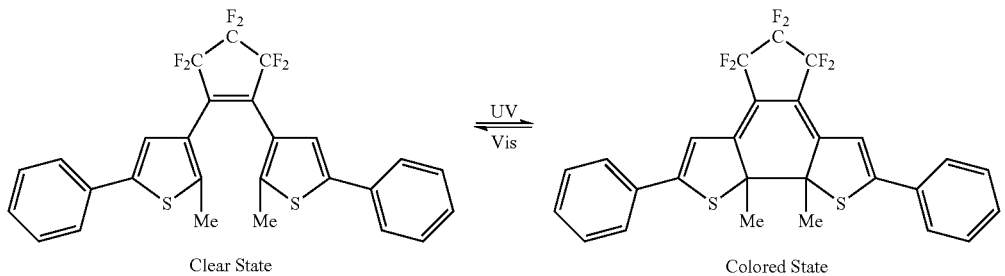

Formula (2)

wherein X is O or S; Y is —CH, N, or P; and each $R_1$, $R_2$, and $R_3$ is independently hydrogen, alkyl, aryl, arylalkyl, heteroaryl, silyl, nitro, sulfo, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio; and wherein two adjacent R groups can be joined together to form a ring.

Formula (2) is a spiropyran when X is O and Y is —CH. Formula (2) is a spirothiopyran when X is S and Y is —CH. It should be noted that the hydrogen atom at the Y location can also be substituted. Specific spiropyrans include spiro[2H-1-benzopyran-2,2'-indolines], spiroindolinonaphthopyrans, spiro[2H-1-benzopyran-2,2' benzothiazolines], spiropyranopyrans, aza-spiroindolinopyrans, spiro[2H-1-benzopyran-2,2'-benzoxazolines], spiro(quinolinopyrans), and spiro(pyridino pyrans).

Colored State

Formula (2) is a spiroxazine when X is O and Y is N. Spiroxazines generally have better fatigue resistance compared to spiropyrans. Specific spiroxazines include spiro[indoline-2,3'-[3H]-naphtho[2,1-b]-1,4-oxazines] and spiro[2H-1,4-benzoxazine-2,2'-indolines.

A specific exemplary compound of Formula (2) is depicted below as Formula (2-a), again showing the closed and open forms:

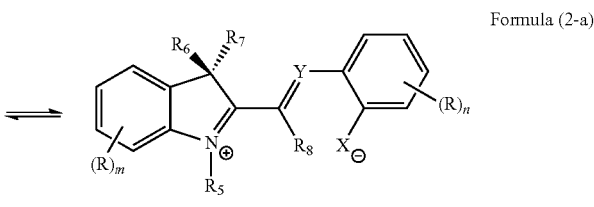

Formula (2-a)

wherein each $R_5$, $R_6$, $R_7$, and $R_8$ are independently selected from the same groups as described above for $R_1$, $R_2$, and $R_3$; X and Y are as described above; m and n are independently integers from 0 to 4; and each R is independently selected from the same groups as described above for $R_1$ except for hydrogen.

The spiro[indoline-2,3'-[3H]-naphtho[2,1-b]-1,4-oxazines] may be represented by the following Formula (2-b):

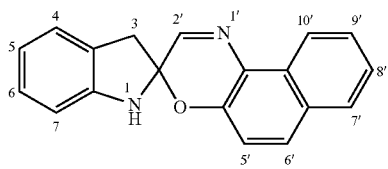

Formula (2-b)

wherein substituents can be present on one or more of the 1, 3, 4, 5, 6, 7, 1', 2', 5', 6', 7', 8', 9', or 10' positions.

The spiro spiro[2H-1,4-benzoxazine-2,2'-indolines] may be represented by the following Formula (2-c):

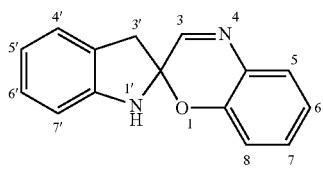

Formula (2-c)

wherein substituents can be present on one or more of the 3, 5, 6, 7, 8, 1', 4', 5', 6', and 7' positions, and the like. Specific examples include 1,3-dihydro-1,3,3-trimethylspiro[2H-indole-2,3'-[3H]naphth[2,1-b]-[1,4]oxazine], 1,3-dihydro-1,3,3-trimethyl-5-nitrospiro[2H-indole-2,3'-[3H]naphth[2,1-b]-[1,4]oxazine], 1,3-dihydro-1,3,3-trimethyl-5,6'-dinitro-spiro[2H-indole-2,3'-[3H]naphth[2,1-b]-[1,4]oxazine], 1,3-dihydro-1,3,3-trimethyl-5-methoxy, 5'-methoxy-spiro[2H-indole-2,3'-[3H]naphth[2,1-b]-[1,4]oxazine], and 1,3-dihydro-1-ethyl-3,3-dimethyl-5'-nitrospiro[2H-indole-2,3'-[3H]naphth[2,1-b]-[1,4]oxazine].

Examples of fulgides and fulgimides include those of general Formula (3):

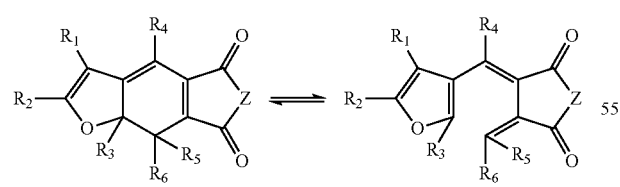

Formula (3)

wherein Z is O or NR; and $R_1$, $R_2$, $R_3$, $R_4$, $R_5$, and $R_6$ are independently hydrogen, alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio; and wherein two adjacent R groups can be joined together to form a ring. When Z is O, the compound of Formula (10) is a fulgide. When Z is NR, the compound of Formula (10) is a fulgimide.

Specific examples of suitable fulgides include 1-(p-methoxyphenyl)-ethylidene (isopropylidene)succinic anhydride; 2-[1-(2,5-dimethyl-3-furyl)-2-methylpropylidene]-3-isopropylidene succinic anhydride; (1,2-dimethyl-4-isopropyl-5-phenyl)-3-pyrryl ethylidene (isopropylidene) succinic anhydride, and the like.

Examples of stilbenes include those of Formula (4):

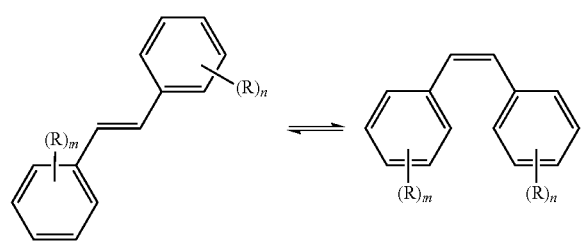

Formula (4)

wherein each R is independently alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio; and m and n are independently integers from 0 to 4; and two R groups can be joined together to form a ring. Here, the cis- and trans-isomers have different absorption spectra. In some embodiments, the cis- form may be colorless or weakly colored and the trans- form may be differently colored.

Specific examples of stilbenes include stilbene (no substituents), 3-methylstilbene, 4-methoxystilbene, 3-methoxystilbene, 4-aminostilbene, 4-fluorostilbene, 3-fluorostilbene, 4-chlorostilbene, 3-chlorostilbene, 4-bromostilbene, 3-bromostilbene, 3-iodostilbene, 4-cyanostilbene, 3-cyanostilbene, 4-acetylstilbene, 4-benzoylstilbene, 4-phenacylstilbene, 4-nitrostilbene, 3-nitrostilbene, 3-nitro-3'-methoxystilbene, 3-nitro-4-dimethylaminostilbene, 4,4'-dinitrostilbene, 4-nitro-4'-methoxystilbene, 4-nitro-3'-methoxystilbene, 4-nitro-4'-aminostilbene, 4-nitro-4'-dimethylaminostilbene, 2,2',4,4',6,6'-hexamethylstilbene, α-methylstilbene, α,α'-dimethylstilbene, α,α'-difluorostilbene, α,α'-dichlorostilbene, 2,4,6-trimethylstilbene, and the like.

Examples of aromatic azo compounds include those of Formula (5):

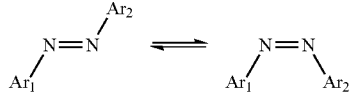

Formula (5)

wherein $Ar_1$ and $Ar_2$ are independently aryl, substituted aryl, heteroaryl, or substituted heteroaryl. These aromatic groups can be substituted with alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, or sulfonic acid groups.

Specific examples of photochromic azo compounds include azobenzene, 2-methoxyazobenzene, 2-hydroxyazobenzene, 4-bromoazobenzene, 4-carbomethoxyazobenzene, 4-acetylazobenzene, 4-carboxyazobenzene, 4-cyanoazobenzene, 4-ethoxyazobenzene, 4-dimethylaminoazobenzene, 4-aminoazobenzene, 4-trimethylammonium azobenzene (with any suitable anion accompanying the ammonium cation), 4-dimethylamino-4'-phenylazobenzene, 4-dimethylamino-4'-hydroxyazobenzene, 4,4'-bis-(dimethylamino)azobenzene, 4-dimethylamino-4'-[13-(p-aminophenyl)ethyl]-azobenzene, 2,6-dimethyl-4-hydroxyazobenzene, 2,2'-4',6,6'-pentamethyl-4-hydroxyazobenzene, 2,2',4',6'-tetrachloro-4-hydroxyazobenzene, 3-sulfonate-4-hydroxyazobenzene, 4,4'-dichloroazobenzene, 4-methoxy-3'-sulfonateazobenzene, 2,2'-azopyridine, 2-phenylazopyridine, 6,6'-azoquinoline, 1-phenylazonaphthalene, 1,1-azonaphthalene, 1-phenylazo-4-naphthol, 1-phenylazo-4-methoxynaphthalene, 3-methylazobenzene, 3-nitroazobenzene, 3-methoxyazobenzene, 3-hydroxyazobenzene, 4-iodoazobenzene, 4-methylazobenzene, 4-acetylazobenzene, 4-methoxyazobenzene, 4-nitroazobenzene, 4-acetamidoazobenzene, 4-dimethylamino-4'-p-aminophenylazobenzene, 4-dimethylamino-4'-p-acetamidophenylazobenzene, 4-dimethylamino-4'-p-aminobenzylazobenzene, 4-dimethylamino-4'-mercuric acetate azobenzene, 4-hydroxyazobenzene, 2-methyl-4-hydroxyazobenzene, 4-hydroxy-4'-methylazobenzene, 2,6-dimethyl-2',4',6'-trichloro-4-hydroxyazobenzene, 4-hydroxy-4'-chloroazobenzene, 2,2'-dimethoxyazobenzene, 3,3'-dinitroazobenzene, 3,3'-dimethylazobenzene, 4,4'-dimethylazobenzene, 4,4'-dimethoxyazobenzene, and the like.

Examples of chromenes (benzopyrans and naphthopyrans) include those of Formula (6):

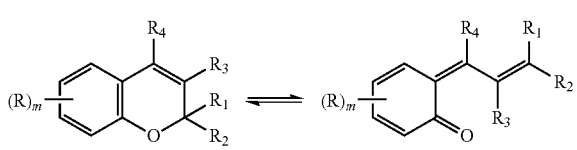

Formula (6)

where $R_1$, $R_2$, $R_3$, and $R_4$ are independently hydrogen, alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio; m and n are independently integers from 0 to 4; and each R is independently selected from the same groups as described above for $R_1$ except for hydrogen; and wherein two R groups can be joined together to form a ring. When no R groups are joined to form a ring, the compound of Formula (4) is a benzopyran. When two R groups are joined to form a ring, the compound of Formula (4) is a naphthopyran.

Specific examples of suitable chromenes include, but are not limited to, 3, 3-diphenyl-3H-naphtho[2,1-b]pyran; 2-methyl-7,7-diphenyl-7H-pyrano-[2,3-g]-benzothiazole; 2,2'-spiroadamantylidene-2H-naphtho-[1,2-b]pyran.

Examples of bisimidazoles include those of Formula (7):

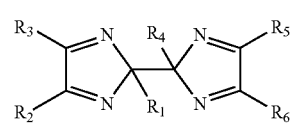

Formula (7)

where $R_1$, $R_2$, $R_3$, $R_4$, $R_5$, and $R_6$ are independently hydrogen, alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio.

Specific examples of suitable photochromic bisimidazoles include, but are not limited to, 2,2',4,4',5,5'-hexaphenyl bisimidazole, 2,2',4,4',5,5'-hexa-p-tolyl bisimidazole, 2,2',4,4',5,5'-hexa-p-chlorophenyl bisimidazole, 2,2'-di-p-chlorophenyl-4,4',5,5'-tetraphenyl bisimidazole, 2,2'-di-p-anisyl-4,4',5,5' etraphenyl bisimidazole, and the like.

Spirodihydroindolizines and related systems such as tetrahydro- and hexahydroindolizine are also suitable photochromic materials. Examples of spirodihydroindolizines include those of Formula (8):

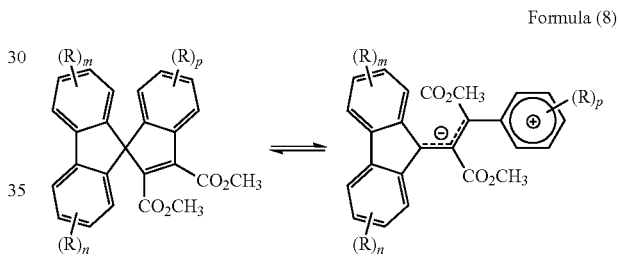

Formula (8)

wherein each R is independently alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio; and m, n and p are independently integers from 0 to 4.

Specific examples of suitable spirodihydroindolizines include 4,5-dicarbomethoxy-3H-pyrazole-(3-spiro-9)-fluorene; 1'H-2',3'-6 tricarbomethoxy-spiro(fluorine-9-1'-pyrrolo[1,2-b]-pyridazine]; 1'H-2',3'-dicyano-7-methoxy-carbonyl-spiro[fluorine-9,1'-pyrrolo-[1,2-b]-pyridine, and the like.

Examples of photochromic quinones include those of Formula (9):

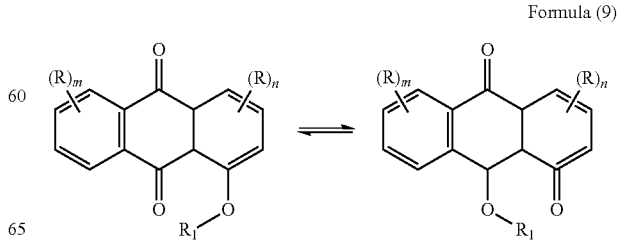

Formula (9)

wherein each R and $R_1$ is independently alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio, and $R_1$ may also be hydrogen; and m and n are independently integers from 0 to 4.

Specific examples of photochromic quinones include 1-phenoxy-2,4-dioxyanthraquinone; 6-phenoxy-5,12-naphthacenequinone; 6-phenoxy-5,12-pentacenequinone; 1,3-dichloro-6-phenoxy-7,12-phthaloylpyrene, and the like.

Examples of permidinespirocyclohexadienones include those of Formula (10):

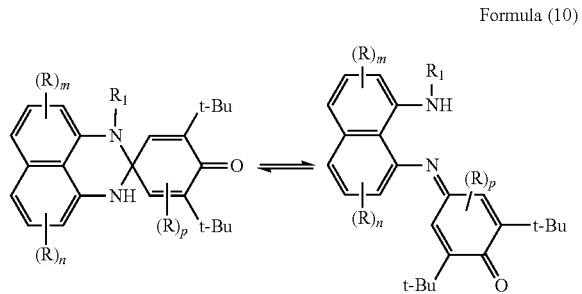

Formula (10)

wherein each R is independently alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio; and m, n and p are independently integers from 0 to 4.

Specific examples of photochromic perimidinespirocyclohexadienones include 2,3-dihydro-2-spiro-4'-(2',6'-di-tert-butylcyclohexadien-2',5'-one)-perimidine; 1-methyl-2,3-dihydro-2-spiro-4'-(2',6'-di-tert-butylcyclohexadien-2',5'-one)-perimidine; 2,3-dihydro-2-spiro-4'-[(4H)-2'-tert-butylnaphthalen-1'-one]perimidine; 5,7,9-trimethyl-2,3-dihydro-2-spiro-4'-(2',6'-di-tert-butylcyclohexadien-2',5'-one)-pyrido-[4,3,2,d,e]quinazoline.

Examples of viologens include those of Formula (11):

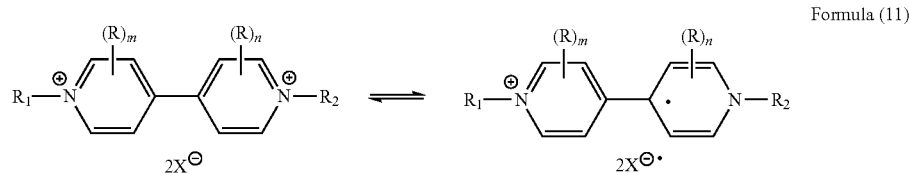

Formula (11)

wherein each R, $R_1$, and $R_2$ is independently alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio, and $R_1$ and $R_2$ may also be hydrogen; m and n are independently integers from 0 to 4; and X is an anion. Examples of suitable anions include halogen, tosylate, and triflate.

Examples of suitable photochromic viologens include, but are not limited to, N,N'-dimethyl-4,4'-bipyridinium dichloride; N,N'-diethyl-4,4'-bipyridinium dibromide; N-phenyl, N'-methyl-4,4,-bipyridinium dichloride and the like.

Examples of triarylmethanes include those of Formula (12):

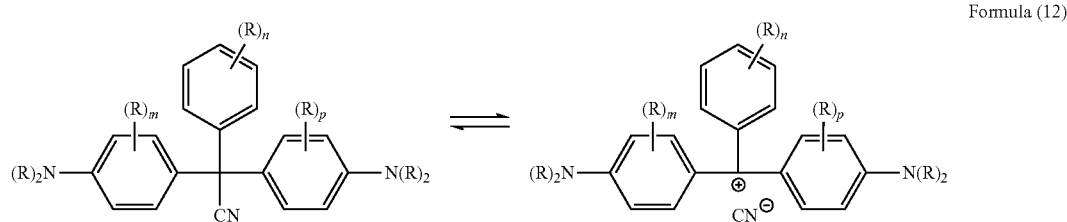

Formula (12)

wherein each R is independently alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio; and m, n and p are independently integers from 0 to 4.

Examples of anils include those of Formula (13):

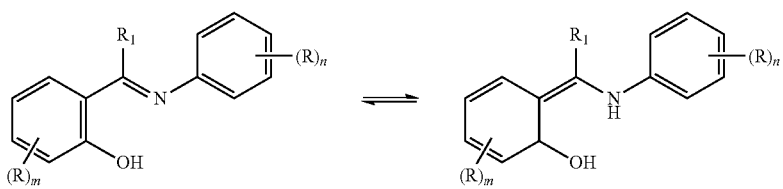

Formula (13)

wherein each R and $R_1$ is independently alkyl, aryl, arylalkyl, heteroaryl, silyl, nitro, cyano, halogen, amine, hydroxyl, alkoxy, aryloxy, alkylthio, arylthio, aldehyde, ketone, ester, amide, carboxylic acid, sulfonic acid, substituted alkyl, substituted aryl, substituted arylalkyl, substituted heteroaryl, substituted alkoxy, substituted aryloxy, substituted alkylthio, or substituted arylthio, and $R_1$ may also be hydrogen; and m and n are independently integers from 0 to 4.

Mixtures of any of the foregoing photochromic materials may also be used.

In an alternative embodiment, a photochromic material that exhibits photochromism at wavelengths of radiation different from the wavelengths of UV radiation used to cure the ink may also be used. While fatigue resistance is less significant in this embodiment because the photochromic material is not subjected to strong energy effecting the photochromic shift in color during UV curing of the ink, fatigue resistance is still desirable in order to derive a printed image that may be subjected to a color change a useful number of times.

The term "alkyl" refers to a radical composed entirely of carbon atoms and hydrogen atoms. The alkyl radical can be saturated or unsaturated. The alkyl radical may be linear, branched, or cyclic. The alkyl radical can be univalent or divalent, i.e. can bond to one or two different non-hydrogen atoms. Examples of alkyl radicals include methyl, ethyl, vinyl, allyl, and propynyl. The term "alkanyl" may be used herein to refer to saturated alkyl radicals, i.e. —$C_nH_{2n+1}$. Alkyl radicals may have from 1 to about 50 carbon atoms, including from 1 to about 30 carbon atoms, from about 1 to about 25 carbon atoms, from about 1 to about 15 carbon atoms, or from about 1 to about 10 carbon atoms.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms). The aryl radical may be univalent or divalent. Aryl radicals may have from about 5 to about 30 carbon atoms, including from about 5 to about 20 carbon atoms.

The term "arylalkyl" refers to an aryl radical which is located at one end of an alkyl radical. An exemplary arylalkyl radical is benzyl (—$CH_2$—$C_6H_5$). Arylalkyl radicals may have a total of from about 6 to about 50 carbon atoms, including from about 6 to about 30 carbon atoms.

The term "heteroaryl" refers to an aromatic radical composed of carbon atoms, hydrogen atoms, and one or more heteroatoms. The carbon atoms and the heteroatoms are present in a cyclic ring or backbone of the radical. The heteroatoms are selected from O, S, and N. Exemplary heteroaryl radicals include thienyl and pyridyl. Note that heteroaryl groups are not a subset of aryl groups. Heteroaryl radicals may have from about 5 to about 30 carbon atoms, including from about 5 to about 20 carbon atoms.

The term "silyl" refers to a radical composed of a tetravalent silicon atom having three radicals attached to the silicon atom. The three radicals may be the same or different, and are usually alkyl. The silicon atom attaches to the molecule.

The term "nitro" refers to the radical —$NO_2$.

The term "sulfo" refers to the radical —$SO4$-.

The term "cyano" refers to the radical —CN.

The term "halogen" refers to fluorine, chlorine, bromine, iodine, and astatine.

The term "amine" refers to —$NR_2$, where each R is independently hydrogen or alkyl.

The term "alkoxy" refers to an alkyl radical which is attached to an oxygen atom, i.e. —OR. Alkoxy radicals may have from 1 to about 50 carbon atoms, including from 1 to about 30 carbon atoms.

The term "aryloxy" refers to an aryl radical which is attached to an oxygen atom. An exemplary aryloxy radical is phenoxy (—O—$C_6H_5$).

The term "alkylthio" refers to an alkyl radical which is attached to a sulfur atom, i.e. —SR. Alkylthio radicals may have from 1 to about 50 carbon atoms, including from 1 to about 30 carbon atoms.

The term "alkylsulfo" refers to an alkyl radical which is attached to a sulfate group, i.e. R—O—$SO_2$—O—. Alkylsulfo radicals may have a total of from about 1 to about 50 carbon atoms, including from about 1 to about 30 carbon atoms.

The term "arylthio" refers to an aryl radical which is attached to a sulfur atom, e.g. —S—$C_6H_5$. Arylthio radicals may have a total of from about 5 to about 30 carbon atoms, including from about 5 to about 20 carbon atoms.

The term "arylsulfo" refers to an aryl radical which is attached to a sulfate group, i.e. Ar—O—$SO_2$—O—. Arylsulfo radicals may have a total of from about 5 to about 30 carbon atoms, including from about 5 to about 20 carbon atoms.

The term "aldehyde" refers to a radical that terminates with an aldehyde group, e.g. —R—CHO or —CHO.

The term "ketone" refers to a carbonyl group that is located between two radicals and attaches to the molecule through one of the radicals, e.g. —$R_1$—CO—$R_2$.

The term "ester" refers to a radical of the formula —$R_1$—COO—$R_2$ or —R1-OCO—$R_2$.

The term "amide" refers to a radical of the formula —$R_1$—CO—$NR_2R_3$ or $R_2$—$NR_3$—CO—$R_1$.

The term "carboxylic acid" refers to a radical that terminates with a carboxyl group, e.g. —COOH or —R—COOM, wherein M is any suitable cation, such as hydrogen, sodium, or potassium.

The term "sulfonic acid" refers to a radical that terminates with a sulfonic acid group, e.g. —SO$_3$H or —R—SO$_3$H.

The term "substituted" refers to at least one hydrogen atom on the named radical being substituted with another functional group. An alkyl radical may be substituted with silyl, nitro, sulfo, cyano, halogen, amine, hydroxyl, aldehyde, ketone, ester, amide, carboxylic acid, or sulfonic acid groups. Aryl, arylalkyl, heteroaryl, alkoxy, aryloxy, alkylthio, alkylsulfo, arylthio, and arylsulfo radicals may be substituted with alkyl, silyl, nitro, sulfo, cyano, halogen, amine, hydroxyl, alkoxy, aryloxy, alkylthio, alkylsulfo, arylthio, arylsulfo, aldehyde, ketone, ester, amide, carboxylic acid, or sulfonic acid groups. An exemplary substituted alkyl group is a perhaloalkyl group, wherein one or more hydrogen atoms in an alkyl group are replaced with halogen atoms. Exemplary substituted aryl groups include methylphenyl and methoxyphenyl. Exemplary substituted heteroaryl groups include 3-methylthienyl.

The photochromic material is present in the ink composition in any desired amount, and is typically present in an amount of from about 0.005 to about 5 weight percent (wt %), based on the total weight of the ink composition. In more specific embodiments, the photochromic material is present in an amount of from about 0.01 to about 2 wt %.

In some embodiments, the photochromic material is colorless under ambient light. In other words, the photochromic material is clear. This provides an ink composition that, when printed, appears colorless under normal reading light but will be visible when placed under ultraviolet (UV) light.

The ink composition also includes a plurality of curable compounds that have certain Hansen solubility parameters. Hansen solubility parameters were developed to help predict whether one material will dissolve in another and form a homogeneous solution. The parameters can also be used to identify materials that are not compatible and/or have limited solubility in one another.

The Hildebrand total solubility parameter can be divided into three Hansen parameters: a dispersion force parameter; a polar parameter; and a hydrogen bonding parameter. The relationship between the Hildebrand total solubility parameter and the three Hansen parameters is governed by the following equation:

$$\partial_t^2 = \partial_d^2 + \partial_p^2 + \partial_h^2$$

wherein $\partial_t$ is the total solubility parameter; $\partial_d$ is the Hansen dispersion force parameter; $\partial_p$ is the Hansen polar parameter; and $\partial_h$ is the Hansen hydrogen bonding Hansen parameter.

In a triangular Teas graph, the three Hansen solubility parameters are presented in a single chart. To do so, the Hansen solubility parameters must be converted into normalized, i.e. fractional, values according to the following equations in order to be plotted in a single, useful chart:

$$f_d = \frac{\partial_d}{\partial_d + \partial_p + \partial_h}$$

$$f_p = \frac{\partial_p}{\partial_d + \partial_p + \partial_h}$$

$$f_h = \frac{\partial_h}{\partial_d + \partial_p + \partial_h}$$

wherein $f_d$ is the Hansen fractional dispersion force parameter; $f_p$ is the fractional polar parameter; and $f_h$ is the fractional hydrogen bonding parameter. The sum of the three normalized parameters will always be 1.

Each compound in the plurality of curable compounds in the ink compositions of the present disclosure has a Hansen fractional dispersion force parameter ($f_d$) of from about 0.4 to about 0.62, a Hansen fractional polar parameter ($f_p$) of from about 0.1 to about 0.3, and a Hansen fractional hydrogen bonding parameter ($f_h$) of from about 0.2 to about 0.4. When a curable compound having the fractional solubility parameters within these ranges is included in the ink composition of the disclosure, the ink composition has the required wetting and release properties. As explained further herein, it was surprisingly discovered that compounds within this design space were best suited for use with the non-aqueous dampening fluids that are useful for digital offset lithography. While one or two of the ink components may have properties outside these preferred ranges, it is best that the volume average solubility parameter for the ink base (no colorant) be within these ranges.

Suitable curable compounds having the required Hansen fractional parameters include several available from Sartomer.

For example, Sartomer CN294E is a tetrafunctional acrylated polyester oligomer. CN294E is a clear liquid having a specific gravity of 9.3 and a viscosity of 4,000 cps at 60° C.

Another example is Sartomer SR-259, which is a polyethylene glycol diacrylate. SR-259 is a clear liquid having a specific gravity of 1.122 at 25° C., a viscosity of 25 cps at 25° C., a surface tension of 41.3 dynes/cm, and a molecular weight of 302 g/mol.

Another example is Sartomer SR306F, which is a tripropylene glycol diacrylate. SR306F is a clear liquid having a specific gravity of 1.038 at 25° C., a viscosity of 15 cps at 25° C., a surface tension of 33.3 dynes/cm, and a molecular weight of 300 g/mol.

Another example is Sartomer SR-492 which is a propoxylated trimethylolpropane triacrylate. SR-492 is a clear liquid having a specific gravity of 1.050 at 25° C., a viscosity of 90 cps at 25° C., a surface tension of 34.0 dynes/cm, and a molecular weight of 470 g/mol.

Another example is Sartomer SR454, which is an ethoxylated trimethylolpropane triacrylate. SR454 is a clear liquid having a specific gravity of 1.103 at 25° C., a viscosity of 60 cps at 25° C., a surface tension of 39.6 dynes/cm, and a molecular weight of 428 g/mol.

Another example is Sartomer SR-368D, which is a tris (2-hydroxyethyl) isocyanurate triacrylate. SR-368D is a clear liquid having a specific gravity of 1.158 at 25° C. and a viscosity of 330 cps at 25° C.

Another example is Sartomer SR444, which is a pentaerythritol triacrylate. SR444 is a clear liquid having a specific gravity of 1.162 at 25° C., a viscosity of 520 cps at 25° C., a surface tension of 39.0 dynes/cm, and a molecular weight of 298 g/mol.

Another example is 1,6-hexanediylbis[oxy(2-hydroxy-3, 1-propanediyl)]bisacrylate. This compound has a molecular weight of 374.43 g/mol and a density of 0.94 g/mL at 25° C.

Another example is glycerol 1,3-diglycerolate diacrylate. This compound has a molecular weight of 484.54 g/mol and a density of 1.18 g/mL at 25° C.

Three additional curable compounds which may be considered for use in the present disclosure are Sartomer SR-348, SR-349, and CN309. Sartomer SR-348 is an ethoxylated bisphenol A dimethacrylate. SR-348 is a clear liquid having a specific gravity of 1.119 at 25° C., a viscosity of 1082 cps at 25° C., a surface tension of 41.0 dynes/cm, and a molecular weight of 452 g/mol. Sartomer SR-349 is an ethoxylated bisphenol A diacrylate. SR-349 is a clear liquid having a specific gravity of 1.145 at 25° C., a viscosity of 1600 cps at 25° C., a surface tension of 43.6 dynes/cm, and a molecular weight of 468 g/mol. Sartomer CN309 contains an acrylate ester that derives from an aliphatic hydrophobic backbone, or in other words is an aliphatic acrylate ester. CN309 is a clear liquid having a specific gravity of 0.92, a density of 7.68 pounds/gallon, a surface tension of 26.3 dynes/cm, a viscosity of 150 centipoise (cps) at 25° C., and a viscosity of 40 cps at 60° C. When present, this aliphatic acrylate ester may be present in an amount of from greater than 0 to about 20 wt % of the ink composition, including from about 9 to about 12 wt %.

In particular embodiments, each compound in the plurality of curable compounds is an acrylate, or in other words contains at least one acrylate group (—O—CO—C(CH$_3$)=CH$_2$). The carbon-carbon double bond in the acrylate group is available for crosslinking during the curing of the ink composition.

The curable compounds can comprise any suitable curable monomer, oligomer, or prepolymer. Examples of suitable materials include radically curable monomer compounds, such as acrylate and methacrylate monomer compounds, which are suitable for use as phase change ink carriers. In embodiments, the at least one monomer, oligomer, or prepolymer is an acrylate monomer, a methacrylate monomer, a multifunctional acrylate monomer, a multifunctional methacrylate monomer, or a mixture or combination thereof.

Specific examples of relatively nonpolar solid acrylate and methacrylate monomers include, for example, lauryl acrylate, lauryl methacrylate, isodecylacrylate, isodecylmethacrylate, octadecylacrylate, behenyl acrylate, cyclohexane dimethanol diacrylate, and the like, as well as mixtures and combinations thereof.

Specific examples of nonpolar liquid acrylate and methacrylate monomers include, for example, isobornyl acrylate, isobornyl methacrylate, caprolactone acrylate, 2-phenoxyethyl acrylate, isooctylacrylate, isooctylmethacrylate, butyl acrylate, and the like, as well as mixtures and combinations thereof. In embodiments, the radiation curable solid ink composition herein further comprises at least one monomer, oligomer, or prepolymer that is a nonpolar liquid acrylate or methacrylate monomer selected from the group consisting of isobornyl acrylate, isobornyl methacrylate, caprolactone acrylate, 2-phenoxyethyl acrylate, isooctylacrylate, isooctylmethacrylate, butyl acrylate, or a mixture or combination thereof.

In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, propoxylated neopentyl glycol diacrylate (available from Sartomer Co. Inc. as SR 9003®), hexanediol diacrylate, tripropylene glycol diacrylate, dipropylene glycol diacrylate, amine modified polyether acrylates (available as PO 83 F®, LR 8869®, and/or LR 8889® (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof.

The particular monomer, oligomer, prepolymer, etc. is not critical to the embodiments, and may include, for example, one or more of the following: allyl methacrylate; tetrahydrofurfuryl methacrylate; ethylene glycol demethacrylate; 1,3butylene glycol diacrylate; 1,4butane diol dimethacrylate; Urethane acrylate blended with tripropylene glycol diacetate; 2-(2-ethoxyethoxy)ethylacrylate; polyethylene glycol (200) diacrylate; pentaerythritol tetraacrylate; tripropylene glycol diacetate; lauryl methacrylate; lauryl acrylate; 2-phenoxyethyl acrylate; polyethylene glycol (400) diacrylate; di-trimethylopropane tetraacrylate; tris-(2hydroxy ethyl) isocyanurate triacrylate; isodecyl acrylate; dipentaerythritol pentaacrylate; ethoxylated (20) trimethylopropane triacrylate; pentaerythritol triacrylate; propoxylated (3) trimethylopropane triacrylate; tridecyl methacrylate; ethoxylated (4) pentaerythritol tetraacrylate; isobornyl acrylate; dipropylene glycol diacrylate; propoxylated neopentyl glycol dicrylate; alkoxylated trifunctional acrylate ester; trifunctional methacrylate ester; trifunctional acrylate ester; pentaacrylate ester; methoxy polyethylene glycol (350) monomethacrylate; alkoxylated cyclohexane dimethanol diacrylate; alkoxylated tetrahydrofurfuryl acrylate; trifunctional acid ester; trifunctional acid ester; tetrafunctional acrylated polyester oligomer; hydrophobic acrylate ester; Urethane acrylate blended with tripropylene glycol diacetate; Urethane acrylate blended with Urethane acrylate blended with tripropylene glycol diacetate; triacrylate urethane acrylate blended with ethoxylated (3) trimethylopropane; triacrylate; urethane acrylate blended with ethoxylated (4) nonyl phenol acrylate; urethane acrylate blended with 1,6-hexanediol diacrylate; urethane acrylate blended with isobornyl acrylate; hexafunctional urethane acrylate; or urethane acrylate.

Other suitable monomers, such as mono-, di-, tri-, or higher-functional monomers, some of which may the same or similar to those described above, may include one or more of the following:

| Mono-functional | |
|---|---|
| Sartomer Code | Chemical Name |
| CD278 | acrylate ester |
| CD420 | acrylic monomer |
| CD421 | 3,3,5 trimethylcyclohexyl methacrylate |
| CD535 | dicyclopentadienyl methacrylate |
| CD545 | diethylene glycol methyl ether methacrylate |
| CD551 | methoxy polyethylene glycol (350) monoacrylate |
| CD552 | methoxy polyethylene glycol (550) monomethacrylate |
| CD553 | methoxy polyethylene glycol (550) monoacrylate |
| CD585 | acrylate ester |
| CD587 | acrylate ester |
| CD588 | acrylate ester |
| CD611 | alkoxylated tetrahydrofurfuryl acrylate |
| CD612 | ethoxylated (4) nonyl phenol methacrylate |
| CD613 | ethoxylated nonyl phenol acrylate |
| CD730 | triethylene glycol ethyl ether methacrylate |
| CD9050 | monofunctional acid ester |
| CD9075 | alkoxylated lauryl acrylate |
| CD9087 | alkoxylated phenol acrylate |
| CD9088 | alkoxylated phenol acrylate |
| SR203 | tetrahydrofurfuryl methacrylate |
| SR242 | isodecyl methacrylate |
| SR256 | 2(2-ethoxyethoxy) ethyl acrylate |
| SR257 | stearyl acrylate |
| SR285 | tetrahydrofurfuryl acrylate |
| SR313 | lauryl methacrylate |
| SR324 | stearyl methacrylate |
| SR335 | lauryl acrylate |

| Mono-functional | |
| --- | --- |
| Sartomer Code | Chemical Name |
| SR339 | 2-phenoxylethyl acrylate |
| SR340 | 2-phenoxylethyl methacrylate |
| SR395 | isodecyl acrylate |
| SR423 | isobornyl methacrylate |
| SR440 | isooctyl acrylate |
| SR484 | octadecyl acrylate |
| SR489 | tridecyl acrylate |
| SR493 | tridecyl methacrylate |
| SR495 | caprolactone acrylate |
| SR504 | ethoxylated (4) nonyl phenol acrylate |
| SR506 | isobornyl acrylate |
| SR531 | cyclic trimethylolpropane formal acrylate |
| SR550 | methoxy polyethylene glycol (350) monomethacrylate |
| SR709 | metallic monomethacrylate |

| Di-functional | |
| --- | --- |
| Sartomer Code | Chemical Name |
| CD262 | 1,12 Dodecandediol Dimethacrylate |
| CD401 | cyclohexane dimethanol dimethacrylate |
| CD406 | cyclohexane dimethanol diacrylate |
| CD536 | acrylate ester |
| CD542 | ethoxylated (8) bisphenol A dimethacrylate |
| CD560 | alkoxylated hexanediol diacrylate |
| CD561 | alkoxylated hexanediol diacrylate |
| CD562 | alkoxylated hexanediol diacrylate |
| CD563 | alkoxylated hexanediol diacrylate |
| CD564 | alkoxylated hexanediol diacrylate |
| CD580 | alkoxylated cyclohexane dimethanol diacrylate |
| CD581 | alkoxylated cyclohexane dimethanol diacrylate |
| CD582 | alkoxylated cyclohexane dimethanol diacrylate |
| CD595 | acrylate ester |
| CD9038 | ethoxylated (30) bisphenol A diacrylate |
| CD9043 | alkoxylated neopentyl glycol diacrylate |
| CD9044 | alkoxylated neopentyl glycol diacrylate |
| SR101 | ethoxylated bisphenol A dimethacrylate |
| SR150 | ethoxylated bisphenol A dimethacrylate |
| SR205 | triethylene glycol dimethacrylate |
| SR206 | ethylene glycol dimethacrylate |
| SR209 | tetraethylene glycol dimethacrylate |
| SR210 | polyethylene glycol dimethacrylate |
| SR212B | 1,3-Butylene Glycol Diacrylate |
| SR213 | 1,4-butanediol diacrylate |
| SR214 | 1,4-butanediol dimethylacrylate |
| SR230 | diethylene glycol diacrylate |
| SR231 | diethylene glycol dimethacrylate |
| SR238 | 1,6-hexanediol diacrylate |
| SR239 | 1,6-hexanediol dimethacrylate |
| SR247 | neopentyl glycol diacrylate |
| SR248 | neopentyl glycol dimethacrylate |
| SR252 | polyethylene glycol (600) dimethacrylate |
| SR259 | polyethylene glycol (200) diacrylate |
| SR268 | tetraethylene glycol diacrylate |
| SR272 | triethylene glycol diacrylate |
| SR297 | 1,3-butylene glycol dimethacrylate |
| SR306 | tripropylene glycol diacrylate |
| SR341 | diacrylate ester |
| SR344 | polyethylene glycol (400) diacrylate |
| SR348 | ethoxylated (2) bisphenol A dimethacrylate |
| SR349 | ethoxylated (3) bisphenol A diacrylate |
| SR480 | ethoxylated (10) bisphenol dimethacrylate |
| SR508 | dipropylene glycol diacrylate |
| SR540 | ethoxylated (4) bisphenol A dimethacrylate |
| SR541 | ethoxylated (6) bisphenol A dimethacrylate |
| SR601 | ethoxylated (4) bisphenol A diacrylate |
| SR602 | ethoxylated (10) bisphenol A diacrylate |
| SR603 | polyethylene glycol (400) dimethacrylate |
| SR610 | polyethylene glycol (600) diacrylate |
| SR644 | polypropylene glycol (400) dimethacrylate |
| SR731 | monomer |
| SR732 | monomer |
| SR740 | polyethylene glycol (1000) dimethacrylate |
| SR833S | tricyclodecane dimethanol diacrylate |
| SR9003 | propoxylated (2) neopentyl glycol diacrylate |
| SR9036 | ethoxylated (30) bisphenol A dimethacrylate |
| SR9045 | alkoxylated neopentyl glycol diacrylate |
| SR9209A | alkoxylated aliphatic diacrylate |

| Tri-functional | |
| --- | --- |
| Sartomer Code | Chemical Name |
| CD501 | propoxylated (6) trimethylolpropane triacrylate |
| CD9021 | highly propoxylated (5.5) glycol triacrylate |
| CD9051 | trifunctional acid ester |
| SR350 | trimethylolpropane trimethacrylate |
| SR351 | trimethylolpropane triacrylate |
| SR368 | tris (2-hydroxy ethyl) isocyanurate triacrylate |
| SR415 | ethoxylated (20) trimethylolpropane triacrylate |
| SR444 | pentaerythritol triacrylate |
| SR454 | ethoxylated (3) trimethylolpropane triacrylate |
| SR492 | propoxylated (3) trimethylolpropane triacrylate |
| SR499 | ethoxylated (6) trimethylolpropane triacrylate |
| SR502 | ethoxylated (9) trimethylolpropane triacrylate |
| SR9020 | propoxylated (3) glycerol triacrylate |
| SR9035 | ethoxylated (15) trimethylolpropane triacrylate |
| SR9012 | trifunctional actrylate ester |

| Higher-functional | |
| --- | --- |
| Sartomer Code | Chemical Name |
| SR295 | PENTAERYTHRITOL TETRAACRYLATE |
| SR355 | ditrimethylolpropane tetraacrylate |
| SR399LV | low viscosity dipentaerythritol pentaacrylate |

In particular embodiments, the plurality of curable compounds includes a tetrafunctional acrylated polyester (e.g. CN294E), a polyethylene glycol diacrylate (e.g. SR-259), or a tripropylene glycol diacrylate (e.g. SR306F). The tetrafunctional acrylated polyester may be present in an amount of from 40 to about 55 wt % of the ink composition, including from about 45 to about 50 wt %. The polyethylene glycol diacrylate may be present in an amount of from 9 to about 11 wt % of the ink composition. The tripropylene glycol diacrylate may be present in an amount of from 0 to about 11 wt % of the ink composition, including from about 9 to about 11 wt %. Generally, the plurality of curable compounds makes up from about 40 to about 95 wt % of the ink composition.

In particular embodiments, the plurality of curable compounds includes the tetrafunctional acrylated polyester and the polyethylene glycol diacrylate. Sometimes, the plurality of curable compounds consists of the tetrafunctional acrylated polyester and the polyethylene glycol diacrylate, and optionally the aliphatic acrylate ester and/or the tripropylene glycol diacrylate.

As mentioned above, the ink composition may have a volume average solubility parameter, without colorant, within the recited Hansen ranges as well. Put another way, the ink compositions of the present disclosure may have a volume average Hansen fractional dispersion force parameter ($f_d$) of from about 0.4 to about 0.62, a volume average Hansen fractional polar parameter ($f_p$) of from about 0.1 to about 0.3, and a volume average Hansen fractional hydrogen bonding parameter ($f_h$) of from about 0.2 to about 0.4. These average fractional parameters can be determined by first calculating the volume fraction of each individual compound in the ink composition, which then enables the calculation of the volume average solubility parameter for each of the individual dispersive, polar and hydrogen bonding contributions to the total solubility parameter of the composition. The fractional components are then calculated from these averages as defined earlier.

Other compounds may also be present in the ink composition and participate in crosslinking, but not have the fractional solubility parameters discussed above, and as a result such compounds should not be considered as being within the plurality of curable compounds. An example of one such compound is a polyether modified acryl functional polydimethylsiloxane, commercially available as BYK UV-3500, which functions as a thickening agent.

Other additives may also be present in the ink composition, such as one or more dispersants, thickening agents, photoinitiators, and/or thermal stabilizers. An exemplary dispersant is SOLSPERSE 39000, available from Lubrizol. A thickening agent is used to adjust the viscosity of the ink composition. Exemplary thickening agents include BYK UV-3500, CLAYTONE HY, an organoclay available from Southern Clay Products, and silica-type materials such as AEROSIL 200 from Degussa. Exemplary photoinitiators include IRGACURE 184 and IRGACURE 819, both available from Ciba Specialty Chemicals. IRGACURE 184 is 1-hydroxy-cyclohexyl-phenyl-ketone, having a molecular weight of 204.3. IRGACURE 819 is bis(2,4,6-trimethylbenzoyl)-phenylphosphine oxide, having a molecular weight of 418.5. An exemplary stabilizer is IRGASTAB UV 10, available from Ciba Specialty Chemicals, which acts as a radical scavenger to prevent the degradation of UV curable compositions. The dispersant(s) may be present in an amount of from about 2 to about 10 wt % of the ink composition, or from about 3 wt % to about 7 wt %, or from about 5 wt %. The thickening agent(s) may be present in an amount of from about 0.2 to about 5 wt % of the ink composition. The photoinitiator(s) may be present in an amount of from 0 to about 10 wt % of the ink composition, including from about 0.5 to about 10 wt %. The thermal stabilizer(s) may be present in an amount of from about 0.1 to about 1 wt % of the ink composition.

In some embodiments, the ink composition includes a colorant. As used herein, the term "colorant" includes pigments, dyes, quantum dots, mixtures thereof, and the like. Any dye or pigment or quantum dot may be chosen, provided that it is capable of being dispersed or dissolved in the ink composition and is compatible with the other ink ingredients. The colorant is present in the ink composition in any desired amount, and is typically present in an amount of from about 10 to about 40 weight percent (wt %), based on the total weight of the ink composition. In more specific embodiments, the colorant is present in an amount of from about 15 to about 30 wt %, or from about 19 wt % to about 25 wt %, based on the total weight of the composition. Various pigments and dyes are known in the art, and are commercially available from suppliers such as Clariant, BASF, and Ciba, to name just a few.

The resulting ink compositions of the present disclosure may have a viscosity of from about 5,000 to about 1,000,000 centipoise at 25° C. and a shear rate of 5 sec$^{-1}$, including a viscosity of from about 5,000 to about 300,000 centipoise, or from about 15,000 to about 250,000 cps, or from about 5,000 cps to about 75,000 cps, or from about 30,000 cps to about 60,000 cps.

The resulting ink compositions of the present disclosure may have a viscosity of from about 2,000 to about 90,000 centipoise at 25° C. and a shear rate of 50 sec$^{-1}$, including a viscosity of from about 5,000 to about 65,000 cps.

The shear thinning index, or SHI, is defined in the present disclosure as the ratio of the viscosity of the ink composition at two different shear rates, here 50 sec$^{-1}$ and 5 sec$^{-1}$. This may be abbreviated as SHI (50/5). The SHI (50/5) may be from about 0.10 to about 0.60 for the ink compositions of the present disclosure, or from about 0.35 to about 0.55.

The ink compositions of the present disclosure may also have a surface tension of at least about 25 dynes/cm at 25° C., including from about 25 dynes/cm to about 40 dynes/cm at 25° C.

The ink compositions of the present disclosure possess many desirable physical and chemical properties. They are compatible with the materials with which they will come into contact, such as the dampening fluid, the surface layer of the imaging member, and the final receiving substrate. They also have the required wetting and transfer properties. They can be UV-cured and fixed in place. They also meet the demanding rheological requirements of the variable lithographic printing apparatus for which the inks of the present disclosure are intended for use. In addition, one of the most difficult issues to overcome is the need for cleaning and waste handling between successive digital images to allow for digital imaging without ghosting of previous images. The inks of the present disclosure are designed to enable very high transfer efficiency, thus overcoming many of the problems associated with cleaning and waste handling. The ink compositions of the present disclosure do not gel, whereas regular offset inks made by simple blending do gel and cannot be used due to phase separation. The ink compositions can contain a high pigment load, and may have a high viscosity suitable for digital offset printing.

Finally, these ink compositions provide the ability to print security features at high speed in short runs with customized data to produce anti-counterfeit packaging. When exposed to the selected radiation, the photochromic material becomes noticeable. Upon being removed from exposure to the activating radiation, the photochromic material returns to a non-visible state. This feature can be useful in authentication of documents, because a forged document or photocopy would not include the photochromic ability. One can also intentionally embed hidden information in a document, which is only revealed to one knowing to expose the document to activating radiation. The change between the two states of the photochromic material can be repeated an indefinite number of times, for example from about 10 to about 100 million times or more.

The ink compositions of the present disclosure can be made according to the methods disclosed in U.S. patent application Ser. No. 13/474,185, filed concurrently and entitled "Methods For Manufacturing Curable Inks For Digital Offset Printing Applications And The Inks Made Therefrom", and fully incorporated by reference herein. Generally, the methods include: a) adding to a mixing vessel at least one monomer or oligomer and at least one dispersant; b) heating the mixing vessel; c) adding at least an initiator or a curing agent and a thermal stabilizer while mixing; d) slowly adding at least one pigment while stirring to form a pigmented radiation curable ink composition; e) cooling the pigmented radiation curable ink composition to about room temperature; and f) milling the pigmented radiation curable ink composition to reduce the particle size of the composition to less than about 1 µm to prepare a pigmented, curable, ink composition.

The photochromic ink compositions of the present disclosure may be applied to a substrate after images using non-photochromic ink have been formed, prior to images from the non-photochromic inks being formed, and/or applied at the same time as any non-photochromic inks. The non-photochromic ink images may be overprinted with a substantially clear photochromic ink composition. The substantially clear photochromic ink compositions disclosed herein may be applied over images printed using non-photochromic ink and has an advantage in that the color of the base print is unimportant because in ambient light the base print may be easily viewed through the clear photochromic ink. The photochromic ink does not adversely affect the appearance of the visible image formed by the non-photochromic ink where the gloss of the images formed from the non-photochromic ink and the gloss of the images formed from the photochromic ink are similar.

The present disclosure contemplates a printing system where the dampening fluid is hydrophobic and the ink composition is somewhat hydrophilic (having a small polar component). This system can be used with an imaging member surface which has low surface energy which is mainly dispersive in character. Thus it can work with an imaging member that is a silicone, fluorosilicone, or Viton® based elastomer, which offers high temperature wear robustness to the laser energy used in variable lithographic printing.

By choosing the proper chemistry, it is possible to devise a system where both the ink and the dampening fluid will wet the imaging member surface, but the ink and the dampening fluid will not mutually wet each other. The system can also be designed so that it is energetically favorable for dampening fluid in the presence of ink residue to actually lift the ink residue off of the imaging member surface by having a higher affinity for wetting the surface in the presence of the ink. In other words, the dampening fluid could remove microscopic background defects (e.g. <1 µm radius) from propagating in subsequent prints.

The dampening fluid should have a slight positive spreading coefficient so that the dampening fluid wets the imaging member surface. The dampening fluid should also maintain a spreading coefficient in the presence of ink, or in other words the dampening fluid has a closer surface energy value to the imaging member surface than the ink does. This causes the imaging member surface to value wetting by the dampening fluid compared to the ink, and permits the dampening fluid to lift off any ink residue and reject ink from adhering to the surface where the laser has not removed dampening fluid. Next, the ink should wet the imaging member surface in air with a roughness enhancement factor (i.e. when no dampening fluid is present on the surface). It should be noted that the surface may have a roughness of less than 1 µm when the ink is applied at a thickness of 1 to 2 µm. Desirably, the dampening fluid does not wet the ink in the presence of air. In other words, fracture at the exit inking nip should occur where the ink and the dampening fluid interface, not within the dampening fluid itself. This way, dampening fluid will not tend to remain on the imaging member surface after ink has been transferred to a receiving substrate. Finally, it is also desirable that the ink and dampening fluid are chemically immiscible such that only emulsified mixtures can exist. Though the ink and the dampening fluid may have alpha-beta coordinates close together, often choosing the chemistry components with different levels of hydrogen bonding can reduce miscibility by increasing the difference in the Hanson solubility parameters.

The role of the dampening fluid is to provide selectivity in the imaging and transfer of ink to the receiving substrate. When an ink donor roll in the ink source of FIG. 1 contacts the dampening fluid layer, ink is only applied to areas on the imaging member that are dry, i.e. not covered with dampening fluid.

In this regard, a material is typically soluble in a solvent if the solvent lies within the solubility sphere of the material. Whether a solvent lies within the solubility sphere of the material may be determined by calculating whether the distance of the solvent from the center of the material's solubility sphere is less than the radius of interaction for the material according to the following equation (1):

$$R_{(S-P)} = \sqrt{4(\partial_d s - \partial_d m)^2 + (\partial_p s - \partial_p m)^2 + (\partial_h s - \partial_h m)^2} \quad (1)$$

wherein $R_{(S-P)}$ is the distance between the solvent and the center of the material solubility sphere (i.e. the radius); $\partial_x s$ is the Hansen component for the solvent; and $\partial_x m$ is the Hansen component for the material. R is also referred to as the radius of interactions.

In the present disclosure, the dampening fluid corresponds to the solvent of equation (1), and the ink composition corresponds to the material of equation (1). Desirably, the ink composition is insoluble in the dampening fluid, so it is preferable that the radius of interactions be as large as possible.

In embodiments, the ink composition contains at least one curable compound which has a radius of interaction greater than 16 with the dampening fluid. In more specific embodiments, the radius of interaction is 18 or greater, or 20 or greater.

It is contemplated that the dampening fluid which is compatible with the ink compositions of the present disclosure is a volatile hydrofluoroether (HFE) liquid or a volatile silicone liquid. These classes of fluids provides advantages in the amount of energy needed to evaporate, desirable characteristics in the dispersive/polar surface tension design space, and the additional benefit of zero residue left behind once evaporated. The hydrofluoroether and silicone are liquids at room temperature, i.e. 25° C.

In specific embodiments, the volatile hydrofluoroether liquid has the structure of Formula (1):

$$C_m H_p F_{2m+1-p} - O - C_n H_q F_{2n+1-q} \quad \text{Formula (1)}$$

wherein m and n are independently integers from 1 to about 9; and p and q are independently integers from 0 to 19. As can be seen, generally the two groups bound to the oxygen atom are fluoroalkyl groups.

In particular embodiments, q is zero and p is non-zero. In these embodiments, the right-hand side of the compound of Formula (I) becomes a perfluoroalkyl group. In other embodiments, q is zero and p has a value of 2m+1. In these embodiments, the right-hand side of the compound of Formula (I) is a perfluoroalkyl group and the left-hand side of the compound of Formula (1) is an alkyl group. In still other embodiments, both p and q are at least 1.

In this regard, the term "fluoroalkyl" as used herein refers to a radical which is composed entirely of carbon atoms and hydrogen atoms, in which one or more hydrogen atoms may be (i.e. are not necessarily) substituted with a fluorine atom, and which is fully saturated. The fluoroalkyl radical may be linear, branched, or cyclic. It should be noted that alkyl groups only partially overlap with fluoroalkyl groups.

The term "perfluoroalkyl" as used herein refers to a radical which is composed entirely of carbon atoms and fluorine atoms which is fully saturated and of the formula —$C_nF_{2n+1}$. The perfluoroalkyl radical may be linear, branched, or cyclic. It should be noted that a perfluoroalkyl group is a subset of fluoroalkyl groups, and should not be considered an alkyl group, but rather a substituted alkyl group.

In particular embodiments, the hydrofluoroether has the structure of any one of Formulas (I-a) through (I-h):

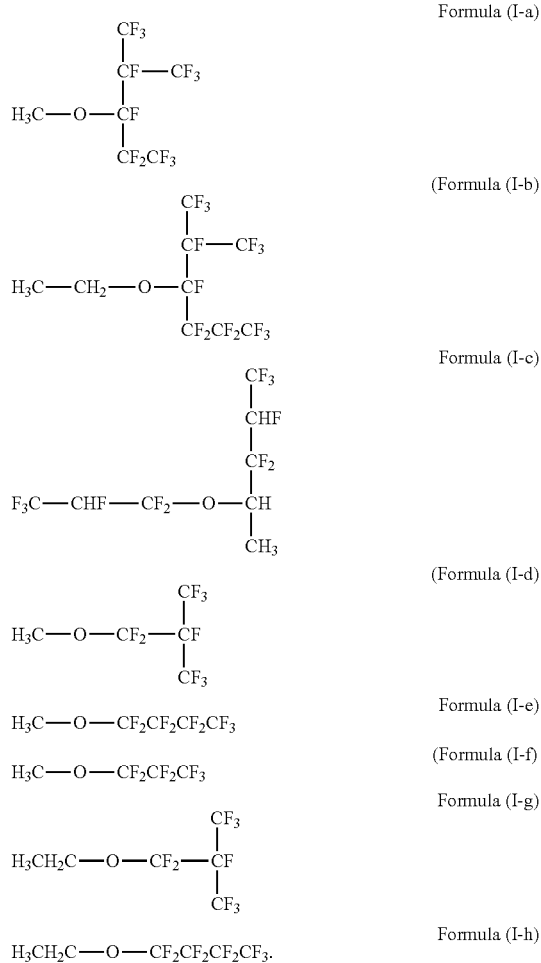

Of these formulas, Formulas (I-a), (I-b), (I-d), (I-e), (I-g), and (I-h) have one alkyl group and one perfluoroalkyl group, either branched or linear. In some terminology, they are also called segregated hydrofluoroethers. Formula (I-c) contains two fluoroalkyl groups and is not considered a segregated hydrofluoroether.

Formula (I-a) is also known as 1,1,1,2,2,3,4,5,5,5-decafluoro-3-methoxy-4-(trifluoromethyl)pentane and has CAS#132182-92-4. It is commercially available as Novec™ 7300.

Formula (I-b) is also known as 3-ethoxy-1,1,1,2,3,4,4,5,5,6,6,6-dodecafluoro-2-(trifluoromethyl)hexane and has CAS#297730-93-9. It is commercially available as Novec™ 7500.

Formula (I-c) is also known as 1,1,1,2,3,3-Hexafluoro-4-(1,1,2,3,3,3-hexafluoropropoxy)pentane and has CAS#870778-34-0. It is commercially available as Novec™ 7600.

Formula (I-d) is also known as methyl nonafluoroisobutyl ether and has CAS#163702-08-7. Formula (I-e) is also known as methyl nonafluorobutyl ether and has CAS#163702-07-6. A mixture of Formulas (I-d) and (1-e) is commercially available as Novec™ 7100. These two isomers are inseparable and have essentially identical properties.

Formula (I-f) is also known as 1-methoxyheptafluoropropane or methyl perfluoropropyl ether, and has CAS#375-03-1. It is commercially available as Novec™ 7000.

Formula (I-g) is also known as ethyl nonafluoroisobutyl ether and has CAS#163702-05-4. Formula (I-h) is also known as ethyl nonafluorobutyl ether and has CAS#163702-06-5. A mixture of Formulas (I-g) and (1-h) is commercially available as Novec™ 7200 or Novec™ 8200. These two isomers are inseparable and have essentially identical properties.

It is also possible that similar compounds having a cyclic aromatic backbone with perfluoroalkyl sidechains can be used. In particular, compounds of Formula (A) are contemplated:

$$Ar-(C_kF_{2k+1})_t \quad \text{Formula (A)}$$

wherein Ar is an aryl or heteroaryl group; k is an integer from 1 to about 9; and t indicates the number of perfluoroalkyl sidechains, t being from 1 to about 8.

Hexafluoro-m-xylene (HFMX) and hexafluoro-p-xylene (HFPX) are specifically contemplated as being useful compounds of Formula (A) that can be used as low-cost dampening fluids. HFMX and HFPX are illustrated below as Formulas (A-a) and (A-b):

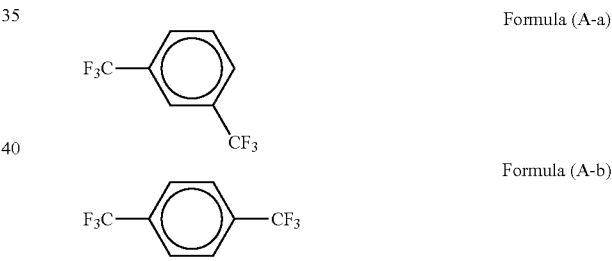

It should be noted any co-solvent combination of fluorinated damping fluids can be used to help suppress non-desirable characteristics such as a low flammability temperature.

Alternatively, the dampening fluid solvent is a volatile silicone liquid. In some embodiments, the volatile silicone liquid is a linear siloxane having the structure of Formula (II):

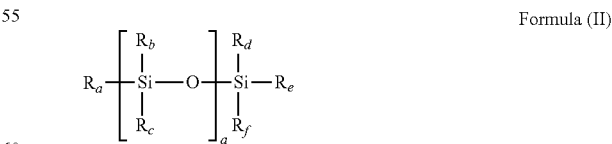

wherein $R_a$, $R_b$, $R_c$, $R_d$, $R_e$, and $R_f$ are each independently hydrogen, alkanyl, or perfluoroalkyl; and a is an integer from 1 to about 5. In some specific embodiments, $R_a$, $R_b$, $R_c$, $R_d$, $R_e$, and $R_f$ are all alkyl. In more specific embodiments, they are all alkyl of the same length (i.e. same number of carbon atoms).

Exemplary compounds of Formula (II) include hexamethyldisiloxane and octamethyltrisiloxane, which are illustrated below as Formulas (II-a) and (II-b):

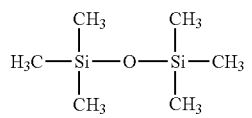

Formula (II-a)

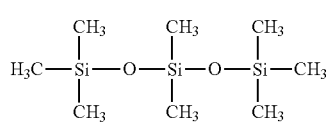

Formula (II-b)

In other embodiments, the volatile silicone liquid is a cyclosiloxane having the structure of Formula (III).

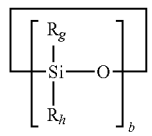

Formula (III)

wherein each $R_g$ and $R_h$ is independently hydrogen, alkanyl, or perfluoroalkyl; and b is an integer from 3 to about 8. In some specific embodiments, all of the $R_g$ and $R_h$ groups are alkanyl. In more specific embodiments, they are all alkanyl of the same length (i.e. same number of carbon atoms).

Exemplary compounds of Formula (III) include octamethylcyclotetrasiloxane (aka D4) and decamethylcyclopentasiloxane (aka D5), which are illustrated below as Formulas (III-a) and (III-b):

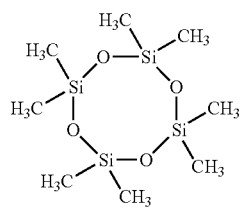

Formula (III-a)

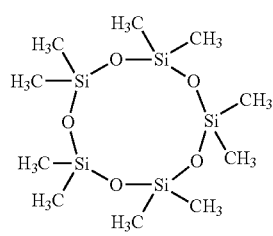

Formula (III-b)

In other embodiments, the volatile silicone liquid is a branched siloxane having the structure of Formula (IV):

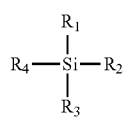

Formula (IV)

wherein $R_1$, $R_2$, $R_3$, and $R_4$ are independently alkanyl or $-OSiR_1R_2R_3$.

An exemplary compound of Formula (IV) is methyl trimethicone, also known as methyltris(trimethylsiloxy)silane, which is commercially available as TMF-1.5 from Shin-Etsu, and shown below with the structure of Formula (IV-a):

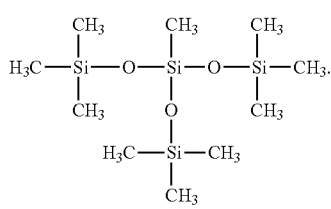

Formula (IV-a)

Any of the above described hydrofluoroethers/perfluorinated compounds are miscible with each other. Any of the above described silicones are also miscible with each other. This allows for the tuning of the dampening fluid for optimal print performance or other characteristics, such as boiling point or flammability temperature. Combinations of these hydrofluoroether and silicone liquids are specifically contemplated as being within the scope of the present disclosure. It should also be noted that the silicones of Formulas (II), (III), and (IV) are not considered to be polymers, but rather discrete compounds whose exact formula can be known.

In particular embodiments, it is contemplated that the dampening fluid comprises a mixture of octamethylcyclotetrasiloxane (D4) and decamethylcyclopentasiloxane (D5). Most silicones are derived from D4 and D5, which are produced by the hydrolysis of the chlorosilanes produced in the Rochow process. The ratio of D4 to D5 that is distilled from the hydrolysate reaction is generally about 85% D4 to 15% D5 by weight, and this combination is an azeotrope.

In particular embodiments, it is contemplated that the dampening fluid comprises a mixture of octamethylcyclotetrasiloxane (D4) and hexamethylcyclotrisiloxane (D3), the D3 being present in an amount of up to 30% by total weight of the D3 and the D4. The effect of this mixture is to lower the effective boiling point for a thin layer of dampening fluid.

The volatile hydrofluoroether liquids and volatile silicone liquids of the present disclosure have a low heat of vaporization, low surface tension, and good kinematic viscosity.

Aspects of the present disclosure may be further understood by referring to the following examples. The examples are illustrative, and are not intended to be limiting embodiments thereof.

EXAMPLES

A description of the materials used in the examples is provided here in Table 1.

TABLE 1

| Material | Description | Supplier |
|---|---|---|
| Irgalite Blue GLO | Pigment | Ciba |
| CN309 | Oligomeric acrylate ester derived from an aliphatic hydrophobic backbone | Sartomer |
| CN293 | Hexafunctional acrylated polyester oligomer | Sartomer |

TABLE 1-continued

| Material | Description | Supplier |
|---|---|---|
| CN294E | Tetrafunctional acrylated polyester oligomer | Sartomer |
| SR259 | Polyethylene glycol (200) diacrylate monomer | Sartomer |
| Solsperse 39000 | Polymeric dispersant | Lubrizol |
| Claytone HY | Rheological additive | Southern Clay |
| Irgacure 184 | Photoinitiator | Ciba |
| Irgacure 819 | Photoinitiator | Ciba |
| Irgastab UV10 | Stabilizer | Ciba |
| BYK 3500 | Surface additive | BYK |
| SR306F | Tripropylene glycol diacrylate monomer | Sartomer |

Example 1

Initially, the Hildebrand solubility parameter approach was used to identify curable monomers and oligomers that were most likely to be compatible with the digital offset printing systems contemplated herein. Screening of suitable ink ingredients was also conducted by measuring the degree of mixability between the ink ingredient and the dampening fluid. NOVEC 7600 was used in the dampening fluid. Other screening criteria included curability, surface tension, viscosity, and safety.

Ninety-nine different monomers and oligomers (i.e possible ink ingredients) were tested and ranked according to the following experimental procedure. Roughly equal amounts (0.5 to 1 mL each) of the monomer/oligomer and Novec™ 7600 were pipetted into a 4 mL vial. The vial was shaken vigorously by hand. Mixability was then visually measured on a scale of 0 to 3. 0 indicated that the materials were not mixable and exhibited rapid phase separation. 1 indicated that the materials exhibited slow phase separation. 2 indicated that the materials formed a cloudy solution without phase separation. 2.5 indicated that the materials formed a clear solution but showed some signs of phase separation over time. 3 indicated that the materials formed a mixable, clear solution. Low mixability was more desirable, as this indicated that the possible ink ingredient might be suitable for inclusion in the ink composition.

Next, the radius of interaction was calculated for nine possible ink ingredients with Novec™ 7600. The mixability was plotted as a function of the radius of interaction for each ingredient. Mixability may be minimized by selecting curable ingredients (or mixtures) that have low mixability or a radius of interaction greater than 16. Ingredients meeting this criteria included Sartomer SR348 and SR349.

Figure 2:
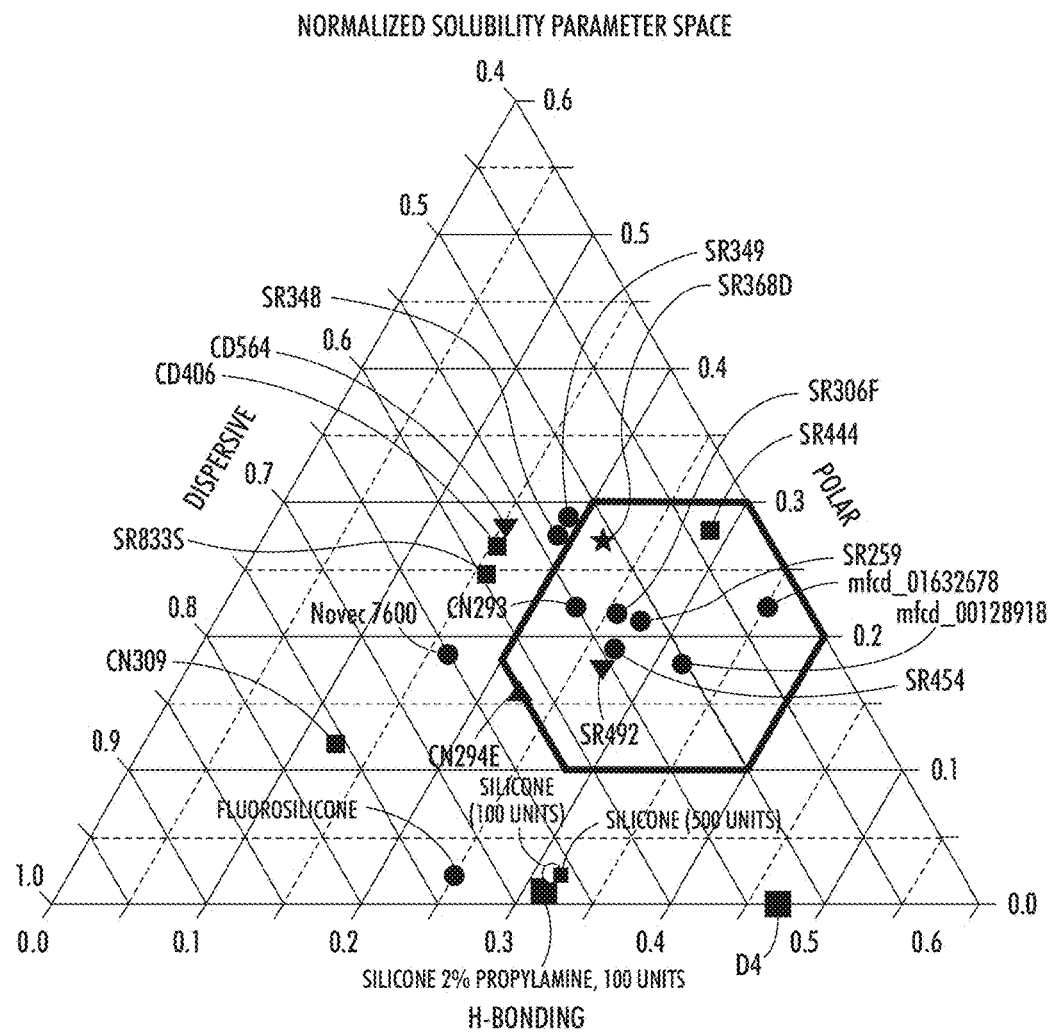
FIG. 2 is a Teas plot showing the Hansen solubility parameters for various curable compounds that can be used in the ink compositions.

Next, a Teas plot of the various ink ingredients and dampening fluids was produced, as shown in FIG. 2 using the Hansen fractional parameters. Some silicones are also shown to indicate the space occupied by materials that are models for the imaging plate used in the imaging system. Unexpectedly, it was found that the ink ingredients that were immiscible with NOVEC 7600 fell within narrow ranges for each fractional solubility parameter. In particular, the optimal range for the fractional dispersion component ($f_d$) was found to be from about 0.4 to about 0.6. The optimal range for the fractional polar component ($f_p$) was found to be from about 0.1 to about 0.3. Lastly, the optimal range for the fractional hydrogen-bonding component ($f_h$) was found to be from about 0.2 to about 0.4. Suitable ink ingredients meeting these parameters included Sartomer CN309, CN294E, SR-259, SR306F, SR-492, SR-368D, SR-348, and SR-349.

The Hansen fractional parameters for various materials are listed in Table 2:

TABLE 2

| Material | $f_H$ | $f_P$ | $f_D$ |
|---|---|---|---|
| Novec 7600 | 0.16079 | 0.18967 | 0.64954 |
| D4 | 0.47027 | 0 | 0.52973 |
| Silicone (500 units) | 0.3134 | 0.00974 | 0.67686 |
| Silicone (100 units) | 0.31468 | 0.02174 | 0.66358 |
| Silicone 2% propylamine, 100 units | 0.31654 | 0.02177 | 0.6617 |
| SR454 | 0.2668 | 0.19376 | 0.53944 |
| SR306F | 0.2571 | 0.21932 | 0.52359 |
| SR259 | 0.27272 | 0.21538 | 0.5119 |
| mfcd_00128918[1] | 0.31684 | 0.18146 | 0.5017 |
| mfcd_01632678[2] | 0.35177 | 0.2246 | 0.42363 |
| SR349 | 0.18876 | 0.28947 | 0.52177 |
| SR348 | 0.18845 | 0.27743 | 0.53412 |
| CD564 | 0.14996 | 0.2844 | 0.56564 |
| SR492 | 0.26515 | 0.18162 | 0.55323 |
| SR368D | 0.21991 | 0.27371 | 0.50638 |
| CM309 | 0.12258 | 0.12211 | 0.75531 |
| CN293 | 0.2264 | 0.22566 | 0.54794 |
| CN294E | 0.22258 | 0.15992 | 0.61751 |
| Fluorosilicone | 0.25008 | 0.02135 | 0.72857 |
| SR833S | 0.157 | 0.25008 | 0.59291 |
| SR444 | 0.2856 | 0.28171 | 0.43269 |
| CD406 | 0.1529 | 0.26956 | 0.57754 |

[1] 1,6-Hexanediylbis[oxy(2-hydroxy-3,1-propanediyl)]bisacrylate
[2] Glycerol 1,3-diglycerolate diacrylate Next, a number of different UV curable ink compositions were formulated. The amounts for each ingredient and properties of the exemplary compositions are listed below in Tables 3A and 3B.

TABLE 3A

| Chemical | C6 wt % | C7 wt % | C8 wt % | C9B wt % |
|---|---|---|---|---|
| Ciba Irgalite Blue GOL | 24 | 21.62 | 24 | 17 |
| Sartomer CN309 | 10.5 | 9.46 | 18.56 | 10.2 |
| Sartomer CN293 | 0 | 0 | 0 | 0 |
| Sartomer CN294e | 51.3 | 46.22 | 42.24 | 49.8 |
| Sartomer SR259 | 0 | 9.01 | 0 | 9.75 |
| Solsperse 39000 | 6 | 5.41 | 6 | 4.25 |
| Southern Clay HY | 2 | 1.8 | 2 | 1.8 |
| Irgacure 184 | 3.5 | 3.15 | 3.5 | 3.5 |
| Irgacure 819 | 2.5 | 2.25 | 2.5 | 2.5 |
| Ciba Irgastab UV10 | .2 | 0.18 | 0.2 | 0.2 |
| BYK 3500 | 0 | 0.9 | 1 | 1 |
| SR306F | 0 | 0 | 0 | 0 |
| Viscosity (5 Hz) | 141,900 | 64.525 | 96,200 | 32,505 |
| Viscosity (50 Hz) | 87,900 | 24.991 | 41,100 | 14,916 |
| SHI (50/5) | 0.62 | 0.39 | 0.43 | 0.46 |

TABLE 3B

| Chemical | C10B wt % | C11B wt % | C9A wt % | C10A wt % | C11A wt % |
|---|---|---|---|---|---|
| Ciba Irgalite Blue GOL | 20 | 20 | 17 | 20 | 20 |
| Sartomer CN309 | 9.65 | 0 | 11.08 | 10.53 | 0 |
| Sartomer CN293 | 0 | 0 | 0 | 0 | 0 |

TABLE 3B-continued

| Chemical | C10B wt % | C11B wt % | C9A wt % | C10A wt % | C11A wt % |
|---|---|---|---|---|---|
| Sartomer CN294e | 47.12 | 47.12 | 54.08 | 51.4 | 51.4 |
| Sartomer SR259 | 9.23 | 9.23 | 10.59 | 10.07 | 10.07 |
| Solsperse 39000 | 5 | 5 | 4.25 | 5 | 5 |
| Southern Clay HY | 1.8 | 1.8 | 1.8 | 1.8 | 1.8 |
| Irgacure 184 | 3.5 | 3.5 | 0 | 0 | 0 |
| Irgacure 819 | 2.5 | 2.5 | 0 | 0 | 0 |
| Ciba Irgastab UV10 | 0.2 | 0.2 | 0.2 | 0.2 | 0.2 |
| BYK 3500 | 1 | 1 | 1 | 1 | 1 |
| SR306F | 0 | 9.65 | 0 | 0 | 10.53 |
| Viscosity (5 Hz) | 47,674 | 34,450 | 32,505 | 42,827 | 26,773 |
| Viscosity (50 Hz) | 19,209 | 34,450 | 32,505 | 42,827 | 26,773 |
| SHI (50/5) | 0.4 | 0.39 | 0.51 | 0.44 | 0.4 |

Rheological data was obtained for the above-described ink compositions using a 25 mm parallel plate and an ARES G2 controlled strain rheometer with a Peltier temperature control system for rapid heating/cooling. An oscillation frequency sweep at 25° C. with a frequency of 0.1 to 400 rad/s and a strain of 10% initial with auto-strain activated was conducted. The shear flow rate at 25° C. was from 0.1 to 500 1/s.

Figure 3:
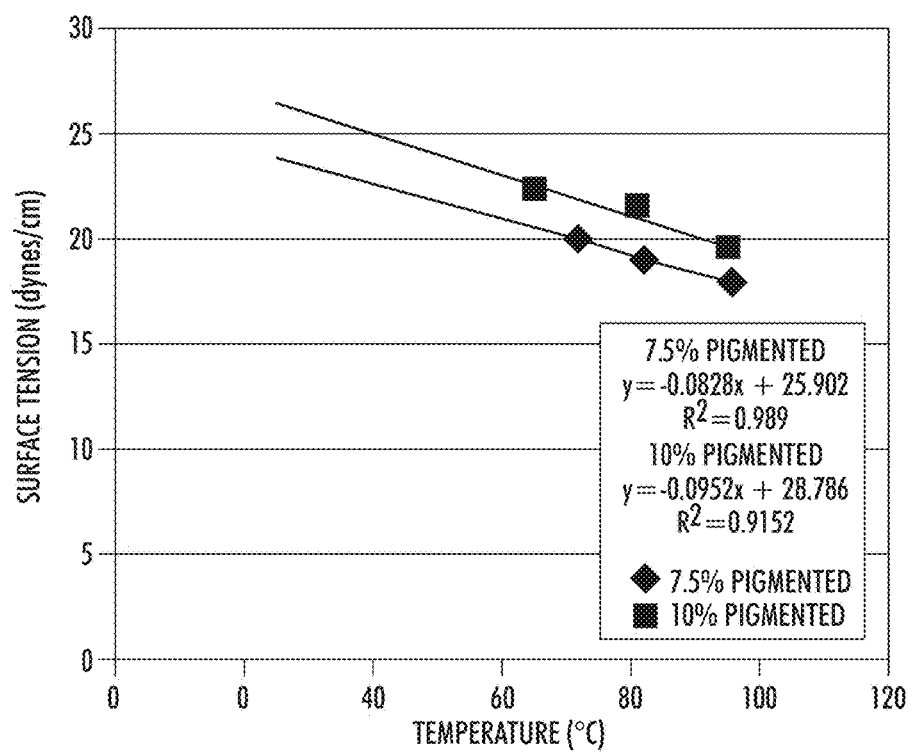
FIG. 3 is a graph showing surface tension data for ink compositions with different pigment loadings.

Surface tension of offset inks is difficult to measure at room temperature due to extremely high viscosity. Surface tension was measured using the Wilhelmy plate method with a Kruss K-100 Tensiometer. FIG. 3 shows the results for dilute cyan offset ink with SR259 at 7.5% pigment loading and 10 wt % pigment loading. Surface tension was measured at various temperatures. Data was collected from 0.1 to 120 seconds using logarithmic decade data sampling. The average of the last points taken is shown in FIG. 3. Using these measurements, extrapolation of surface tension at 25° C. and 21.6 wt % pigment in offset ink resulted in a surface tension of from 30 dynes/cm to 38 dynes/cm.

The curable inks of the present disclosure were imaged on a test fixture. Improved imaging performance was observed, particularly for the inks of lower viscosity, typically less than about 30,000 cPs, and for the inks that were formulated from the concentrates above by adding additional low viscosity monomers. For example, Ink C11B was further diluted with additional SR306F (about 20% by weight) to yield prints that had improved color characteristics. The shear thinning index (SHI) may be adjusted to improve performance.

Example 2

A clear ink base was prepared by mixing the components shown in Table 3:

TABLE 4

| Component | Amount (wt %) |
|---|---|
| Sartomer CN309 | 9.90 |
| Sartomer CN294E | 74.83 |
| Sartomer SR259 | 9.43 |
| Ciba Irgacure 184 | 3.30 |
| Ciba Irgacure 819 | 2.35 |
| Ciba Irgastab UV10 | 0.19 |

A photochromic ink was then prepared using the clear ink base. 100 grams of the clear ink base was mixed with 2 grams of the photochromic compound (dithienylethene) illustrated below for three hours at 80° C., then cooled to room temperature (resulting composition having ~2 wt % photochromic). This photochromic compound becomes blue on activation with UV light.

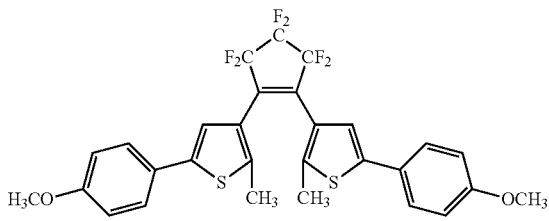 [SMILES: COc1ccc(-c2cc(C3=C(c4cc(-c5ccc(OC)cc5)sc4C)C(F)(F)C(F)(F)C3(F)F)c(C)s2)cc1]

Photochromic Evaluation

The photochromic ink was then evaluated for photochromic behavior. The inks was deposed on a rubber stamp, then transferred to paper substrate. The stamped images were cured by using a UV Fusion LC-6B Benchtop Conveyor equipped with UV Fusion F300S Ultraviolet Lamp System. The cured image was then exposed to visible light to ensure the photochromic compound was in a colorless passive state.

Figure 4:
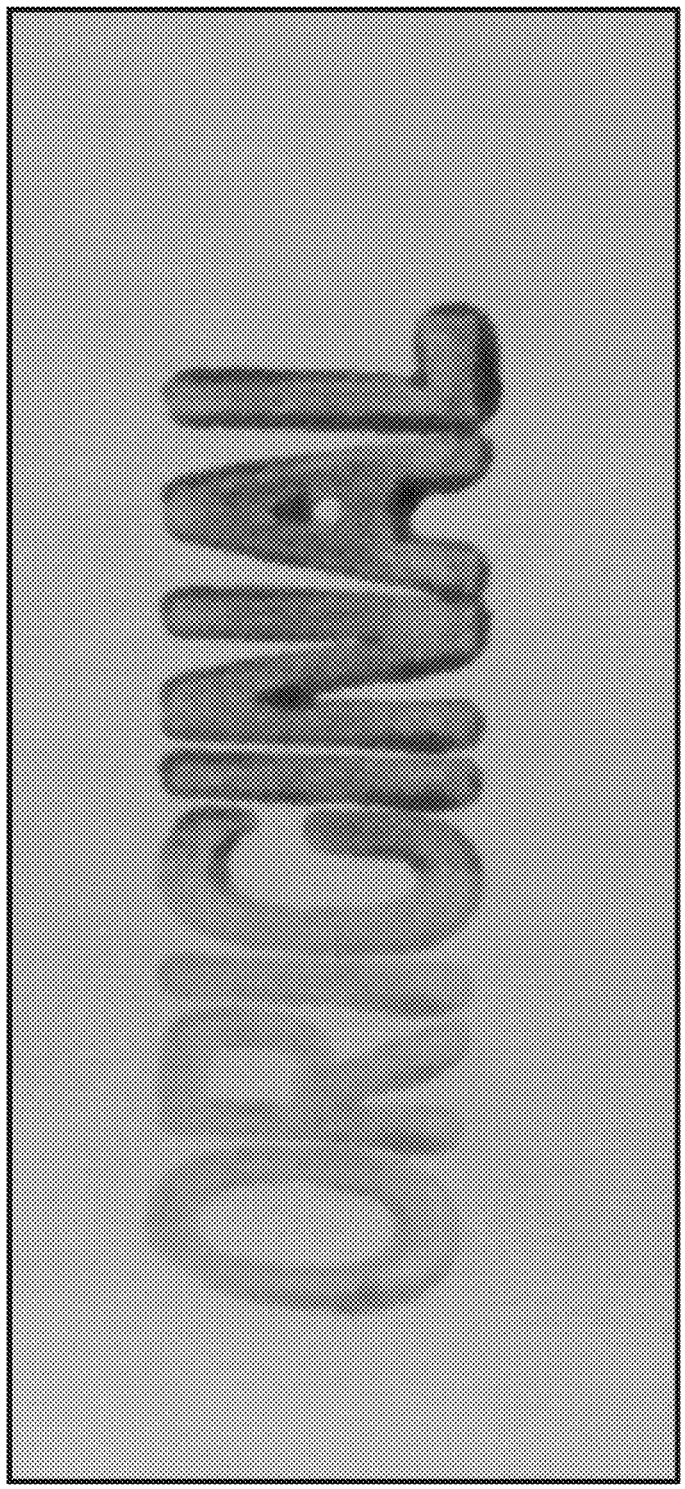
FIG. 4 is a photograph showing a photochromic ink which has been exposed to ambient light and to UV light.

The cured image was tested for coloration when exposed to UV light (365 nm). FIG. 4 shows an image of the photochromic ink, with the left side of the image being protected from UV exposure, and the right side of the image being under UV exposure. There is a clear contrast in color between the two sides. This figure confirmed that the ink was cured, the photochromic component was not degraded by the UV curing process, and the ink changes to a colored state when exposed to UV light. The exposure to UV light was repeated many times without any visible sign of decay or fatigue in switching.

Ink Transfer Evaluation

Next, the photochromic ink was evaluated to determine whether it displayed equivalent ink transfer performance to ink compositions that did not contain the photochromic material. A "pass" for the transfer performance evaluation translates typically into a good performance of the tested ink in a "print fixture" based on Digital Offset Technology.

The evaluation was carried out via a hand experiment using a rubber inking roller, a cotton applicator to apply fountain solution, a conformable rubber pressure roller, and DCEG (digital colour elite gloss) paper. The plate material used was prepared from Toray silicone containing 10% carbon black, and textured with ~1 micron surface roughness using a mold (Allied plate). This plate was chosen because it showed good de-inking performance. The fountain solutions used for testing were NOVEC 7600 hydrofluoroether (from 3M) and octamethylcyclotetrasiloxane (D4) fountain solution.

The ink transfer procedure was as follows. Initially, the plate surface was wiped with isopropanol and dried. If fountain solution blocking was evaluated, the fountain solution was applied with a cotton applicator to the surface as a narrow, thin layer. Next, the ink was thinned over a plastic substrate, then applied to the plate. If the fountain solution was applied, the ink was applied over the fountain solution. Then, paper was placed over the inked plate surface, and three passes of moderate pressure were applied over the paper surface with the conformable rubber pressure roller. The paper was then peeled from the plate.

The ink transfer procedure was repeated three times in succession in order to evaluate the efficiency of ink transfer and residual ink left on the plate surface. Inking/blocking/de-inking results are all evaluated with respect to the Toray plate surface and the mainline ink formulation. After three passes, little to no ink should remain on the plate surface, and the third transfer should display significantly less ink than the first. The fountain solution should block ink wetting of the surface and completely prevent ink showthrough in the area where fountain solution was applied. This performance is considered a "pass" for subsequent development.

Comparative Example

Mainline Ink with Cyan Pigment, No Photochromic Material

Figure 5:
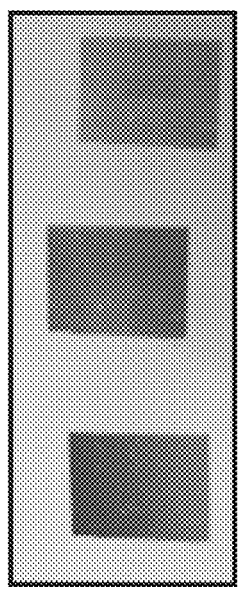
FIG. 5 is a photograph showing the plate after each of three passes using a control ink.

The ink transfer test was first performed using a mainline ink with cyan pigment and no photochromic material to serve as a control. FIG. 5 shows the ink transfers after each pass (no fountain solution). The ink transferred well, so that after the third pass, only a small amount of ink could be detected on the plate surface.

Figure 6:
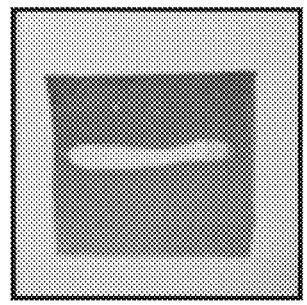
FIG. 6 is a photograph showing the transfer of the control ink in the presence of NOVEC fountain solution.
Figure 7:
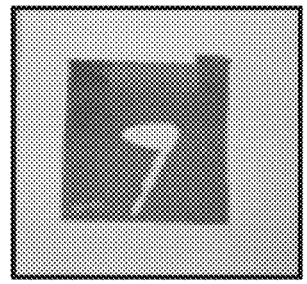
FIG. 7 is a photograph showing the transfer of the control ink in the presence of D4 fountain solution.

Ink transfer in the presence of fountain solution is shown in FIG. 6 (NOVEC) and FIG. 7 (D4). The fountain solutions performed very well: no ink was transferred onto the paper in the areas where the plate contained the fountain solutions.

Example

Photochromic Ink

Figure 8:
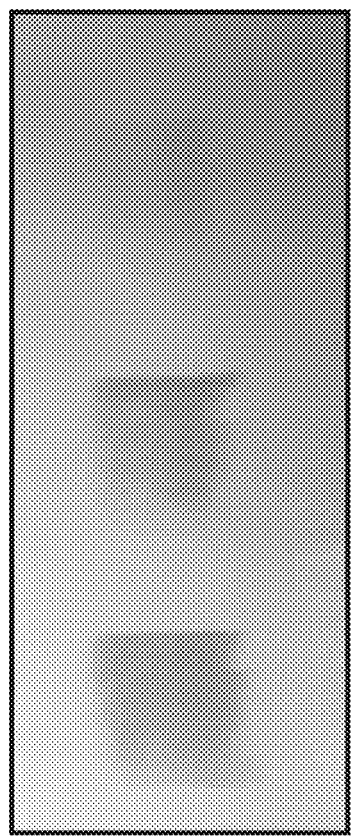
FIG. 8 is a photograph showing the plate after each of three passes using a cyan photochromic ink of the present disclosure.

The ink transfer test was then performed using the photochromic ink. FIG. 8 shows the ink transfers after each pass (no fountain solution). The ink was illuminated with UV to produce coloration. The performance was similar to or better than that of the Comparative Example. Little ink was transferred on the third pass. After three passes, little to no residual ink remained on the plate surface.

Figure 9:
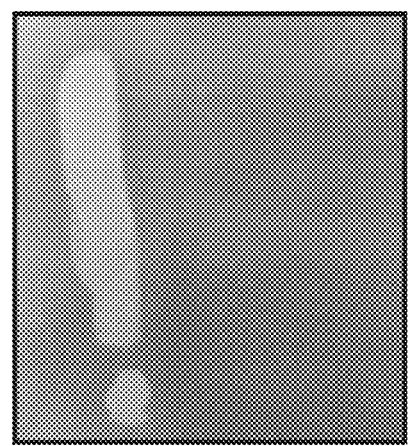
FIG. 9 is a photograph showing the transfer of the cyan photochromic ink in the presence of D4 fountain solution.

Ink transfer in the presence of fountain solution is shown in FIG. 9 (D4). The ink was illuminated with UV to produce coloration. Again, the D4 fountain solution performed well: no ink was transferred onto the paper in the areas where the plate contained the fountain solution.

To summarize, the ink transfer test showed that the photochromic inks had image transfer properties comparable to the Comparative Example. There was minimal image transfer after the third pass, and no ink transferred to the paper in the areas covered by fountain solution.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An ink composition comprising
   a photochromic material,
   a colorant and
   a plurality of curable compounds,
   wherein the ink composition has
      a volume average Hansen fractional dispersion force parameter ($f_d$) of from about 0.4 to about 0.62,
      a volume average Hansen fractional polar parameter ($f_p$) of from about 0.1 to about 0.3, and
      a volume average Hansen fractional hydrogen bonding parameter ($f_h$) of from about 0.2 to about 0.4,
   wherein the colorant comprises quantum dots,
   wherein the photochromic material comprises a diarylethene, spiropyran, spiroxazine, stilbene, aromatic azo compound, benzopyran, naphthopyran, spirodihydroindolizine, quinone, permidinespirocyclohexadienone, viologen, fulgide, fulgimide, triarylmethane, or anil, and
   wherein the plurality of curable compounds consist of, based on the total weight of the ink composition:
      from about 40 to about 55 wt % of a tetrafunctional acrylated polyester;
      from about 9 to about 11 wt % of a polyethylene glycol diacrylate;
      from about 9 to about 11 wt % of a tripropylene glycol diacrylate; and
      from greater than 0 to about 20 wt % of an aliphatic acrylate ester.

2. The ink composition of claim 1, wherein the photochromic material is colorless under ambient light.

3. The ink composition of claim 1, wherein the photochromic material is present in an amount of from about 0.005 to about 5 wt % of the ink composition.

4. The ink composition of claim 1, further comprising at least one additive selected from the group consisting of dispersants, thickening agents, photoinitiators, and stabilizers.

5. The ink composition of claim 1, further comprising, based on the total weight of the ink composition:
   from about 2 to about 10 wt % of a dispersant;
   from about 0.2 to about 5 wt % of a thickening agent;
   from 0 to about 10 wt % of a photoinitiator; and
   from about 0.1 to about 1 wt % of a thermal stabilizer.

6. The ink composition of claim 1, containing from about 10 to about 40 wt % of a colorant, based on the total weight of the ink composition.

7. The ink composition of claim 1, wherein the ink composition has a viscosity of from about 5,000 to about 1,000,000 centipoise at 25° C. and a shear rate of 5 sec$^{-1}$.

8. The ink composition of claim 1, wherein the ink composition has a viscosity of from about 2,000 to about 90,000 centipoise at 25° C. and a shear rate of 50 sec$^{-1}$.

9. The ink composition of claim 1, wherein the ink composition has a shear thinning index (50/5) at 25° C. of from about 0.10 to about 0.60.

10. The ink composition of claim 1, wherein the ink composition has a surface tension of from about 25 dynes/cm to about 40 dynes/cm at 25° C.

11. The ink composition of claim 1, wherein the plurality of curable compounds comprises more than 50 wt % of the ink composition.

12. A process for marking a substrate with a security feature, comprising:
printing an image on the substrate with an ink composition that comprises
a photochromic material,
a colorant and
a plurality of curable compounds,
the ink composition having
a volume average Hansen fractional dispersion force parameter ($f_d$) of from about 0.4 to about 0.62,
a volume average Hansen fractional polar parameter ($f_p$) of from about 0.1 to about 0.3, and
a volume average Hansen fractional hydrogen bonding parameter ($f_h$) of from about 0.2 to about 0.4,
wherein the colorant comprises quantum dots,
wherein the photochromic material comprises two or more photochromic materials, and
wherein the two or more photochromic materials comprise a diarylethene, spiropyran, spiroxazine, stilbene, aromatic azo compound, benzopyran, naphthopyran, spirodihydroindolizine, quinone, permidinespirocyclohexadienone, viologen, fulgide, fulgimide, diarylethene, triarylmethane, or anil, and
wherein the plurality of curable compounds consist of, based on the total weight of the ink composition:
from about 40 to about 55 wt % of a tetrafunctional acrylated polyester;
from about 9 to about 11 wt % of a polyethylene glycol diacrylate;
from about 9 to about 11 wt % of a tripropylene glycol diacrylate; and
from greater than 0 to about 20 wt % of an aliphatic acrylate ester.

13. An ink composition comprising
a photochromic material,
a colorant, and
a plurality of curable compounds,
wherein each curable compound has
a Hansen fractional dispersion force parameter ($f_d$) of from about 0.4 to about 0.62,
a Hansen fractional polar parameter ($f_p$) of from about 0.1 to about 0.3, and
a Hansen fractional hydrogen bonding parameter ($f_h$) of from about 0.2 to about 0.4,
wherein the colorant comprises quantum dots,
wherein the photochromic material comprises a diarylethene,
wherein the diarylethene comprises 1,2-bis-(2,4-dimethylthiophen-3-yl) perfluorocyclopentene; 1,2-bis-(3,5-dimethylthiophen-3-yl) perfluorocyclopentene; or 1,2-bis-(2,4-diphenylthiophen-3-yl) perfluorocyclopentene, and
wherein the plurality of curable compounds consist of, based on the total weight of the ink composition:
from about 40 to about 55 wt % of a tetrafunctional acrylated polyester;
from about 9 to about 11 wt % of a polyethylene glycol diacrylate;
from about 9 to about 11 wt % of a tripropylene glycol diacrylate; and
from greater than 0 to about 20 wt % of an aliphatic acrylate ester.

14. The method ink composition of claim 13, wherein the photochromic material switches between a colorless state, upon exposure to visible light, and a dark blue state, upon exposure to UV light.

* * * * *